US012640600B2

(12) United States Patent
Itoyama et al.

(10) Patent No.: US 12,640,600 B2
(45) Date of Patent: May 26, 2026

(54) METHOD OF PRODUCING MAGNET MATERIAL, METHOD OF PRODUCING ROTOR OF ELECTRIC MOTOR, METHOD OF PRODUCING ELECTRIC MOTOR, AND MAGNET MATERIAL

(71) Applicant: HONDA MOTOR CO., LTD., Tokyo (JP)

(72) Inventors: Ryosuke Itoyama, Saitama (JP); Yasuhito Takei, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 573 days.

(21) Appl. No.: 18/185,380

(22) Filed: Mar. 17, 2023

(65) Prior Publication Data

US 2023/0352990 A1    Nov. 2, 2023

(30) Foreign Application Priority Data

Mar. 31, 2022    (JP) ................................. 2022-060229

(51) Int. Cl.
| | |
|---|---|
| *H02K 1/02* | (2006.01) |
| *H02K 1/27* | (2022.01) |
| *H02K 15/03* | (2025.01) |

(52) U.S. Cl.
CPC ................. *H02K 1/02* (2013.01); *H02K 1/27* (2013.01); *H02K 15/03* (2013.01)

(58) Field of Classification Search
CPC .......... H02K 1/02; H02K 1/27; H01F 13/006; C21D 1/74; C21D 1/76
(Continued)

(56) References Cited

U.S. PATENT DOCUMENTS 4,968,347 A * 11/1990 Ramesh ................ H01F 1/0577
148/108
5,110,377 A * 5/1992 Yamamoto ................ B22F 3/24
75/246
(Continued)

FOREIGN PATENT DOCUMENTS

| JP | 2002057052 A | 2/2002 |
|---|---|---|
| JP | 2003197411 A | 7/2003 |
(Continued)

OTHER PUBLICATIONS

Hiroyuki Hoshi, et.al., "Technique for Separating Rare Earth Elements from R—Fe—B Magnets by Carbothermal Reduction Method", The Japan Institute of Metals and Materials, 2014, p. 258-266, 78 (7).

*Primary Examiner* — Terrance L Kenerly
*Assistant Examiner* — Theodore L Perkins

(57) ABSTRACT

A magnet material producing method includes demagnetizing, by thermal demagnetization in an irreversible manner, a molded permanent magnet, by heating the permanent magnet in a presence of a reducing substance having a reducing property stronger than nitrogen molecules, and cooling the demagnetized permanent magnet to create a molded magnet material. A magnet material with a thickness of 30 $\mu$m or more contains, as main components, a rare earth element and a transition metal element. In the above described magnet material, a ratio of (b) a carbon concentration in a surface layer region that is a region within 10 $\mu$m from a surface of the magnet material to (a) a carbon concentration in an interior region that is a region arranged in a position away from the surface of the magnet material by more than 10 $\mu$m and having a thickness of 10 $\mu$m is 1.1 or more.

19 Claims, 9 Drawing Sheets

(58) Field of Classification Search
  USPC ..................................................... 310/156.43
  See application file for complete search history.

(56)        References Cited

U.S. PATENT DOCUMENTS

| | | | | |
|---|---|---|---|---|
| 5,354,389 | A * | 10/1994 | Arai | C22C 38/02 |
| | | | | 148/112 |
| 5,679,178 | A * | 10/1997 | Komatsubara | C21D 8/1244 |
| | | | | 148/113 |
| 2004/0036566 | A1 * | 2/2004 | Komuro | H01F 41/0273 |
| | | | | 335/306 |
| 2010/0170319 | A1 * | 7/2010 | Wiberg | C21D 9/0093 |
| | | | | 72/350 |
| 2013/0162089 | A1 * | 6/2013 | Komuro | H02K 1/02 |
| | | | | 310/156.01 |
| 2020/0303106 | A1 * | 9/2020 | Suetsuna | H01F 1/26 |

FOREIGN PATENT DOCUMENTS

| | | | |
|---|---|---|---|
| JP | 2003257768 | A | 9/2003 |
| JP | 2007288205 | A | 11/2007 |
| JP | 2007324461 | A | 12/2007 |
| JP | 2008063641 | A | 3/2008 |
| JP | 2009054704 | A | 3/2009 |

* cited by examiner

20

START

S 322 — REMOVE ROTOR 20 FROM MOTOR 10

S 324 — HEAT ROTOR 20 TO DEMAGNETIZE PERMANENT MAGNET 24

S 326 — COOL ROTOR 20

S328 — REMOVE DEMAGNETIZED PERMANENT MAGNET 24 (MOLDED BODY 34) FROM ROTOR 20

S330 — INSPECT MOLDED BODY 34 AND/OR PERFORM SURFACE TREATMENT TO CREATE RECLAIMED MATERIAL 44

S 340 — CREATE RECLAIMED PRODUCT 50 OF ROTOR 20 BY USING RECLAIMED MATERIAL 44

S 350 — CREATE MOTOR 10 BY USING RECLAIMED PRODUCT 50

END

METHOD OF PRODUCING MAGNET MATERIAL, METHOD OF PRODUCING ROTOR OF ELECTRIC MOTOR, METHOD OF PRODUCING ELECTRIC MOTOR, AND MAGNET MATERIAL

The contents of the following Japanese application are incorporated herein by reference: No. 2022-060229 filed in JP on Mar. 31, 2022.

BACKGROUND

1. Technical Field

The present invention relates to a method of producing magnet material, a method of producing rotor of electric motor, a method of producing electric motor, and a magnet material.

2. Related Art

Patent documents 1 to 7 disclose that a sintered magnet is heated under an argon atmosphere, under a nitrogen atmosphere, or under a vacuum atmosphere. Non-patent document 1 discloses that an R—Fe—B based magnet is melted by a carbothermal reduction method to separate magnet materials into pig iron and slag, and a rare earth element is extracted from the slag.

PRIOR ART DOCUMENTS

Patent Documents (Patent document 1) Japanese Patent Application Publication No. 2002-057052
(Patent document 2) Japanese Patent Application Publication No. 2003-197411
(Patent document 3) Japanese Patent Application Publication No. 2003-257768
(Patent document 4) Japanese Patent Application Publication No. 2007-288205
(Patent document 5) Japanese Patent Application Publication No. 2007-324461
(Patent document 6) Japanese Patent Application Publication No. 2008-063641
(Patent document 7) Japanese Patent Application Publication No. 2009-054704

Non-Patent Document (Non-patent document 1) Hiroyuki Hoshi, Yu Miyamoto, Katsuyoshi Furusawa, "Technique for Separating Rare Earth Elements from R—Fe—B Magnets by Carbothermal Reduction Method", 2014, The Japan Institute of Metals and Materials, 78 (7), p. 258-266

DESCRIPTION OF EXEMPLARY EMBODIMENTS

Figure 1:
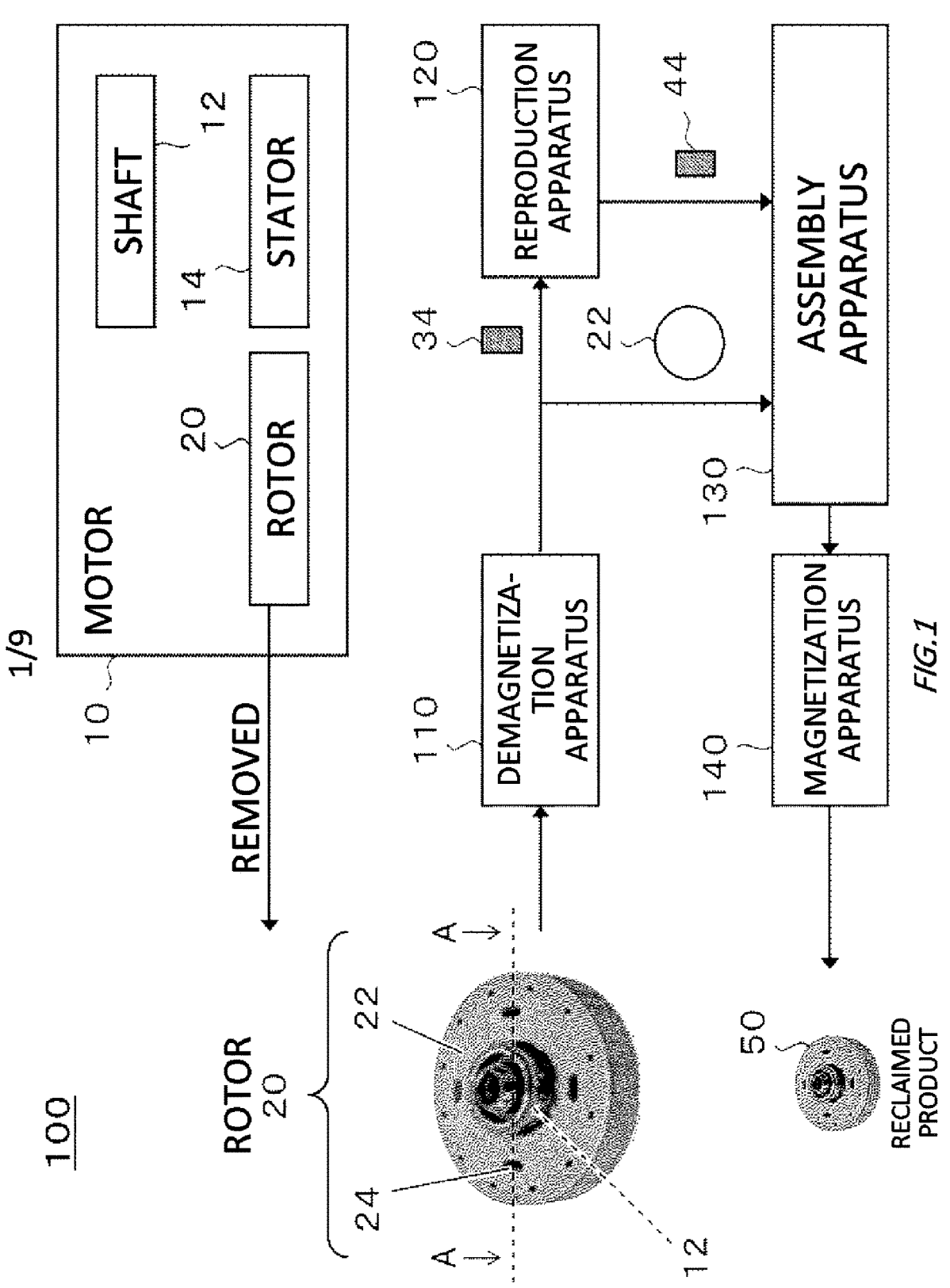
FIG. 1 schematically illustrates an example of a system configuration of a rotor manufacturing system 100.

Hereinafter, the present invention will be described by way of embodiments, but the following embodiments do not limit the invention according to the claims. In addition, not all of the combinations of features described in the embodiments are essential to the solving means of the invention. Note that in the drawings, same or similar parts are assigned with same reference signs, and duplicated descriptions may be omitted.

Figure 2:
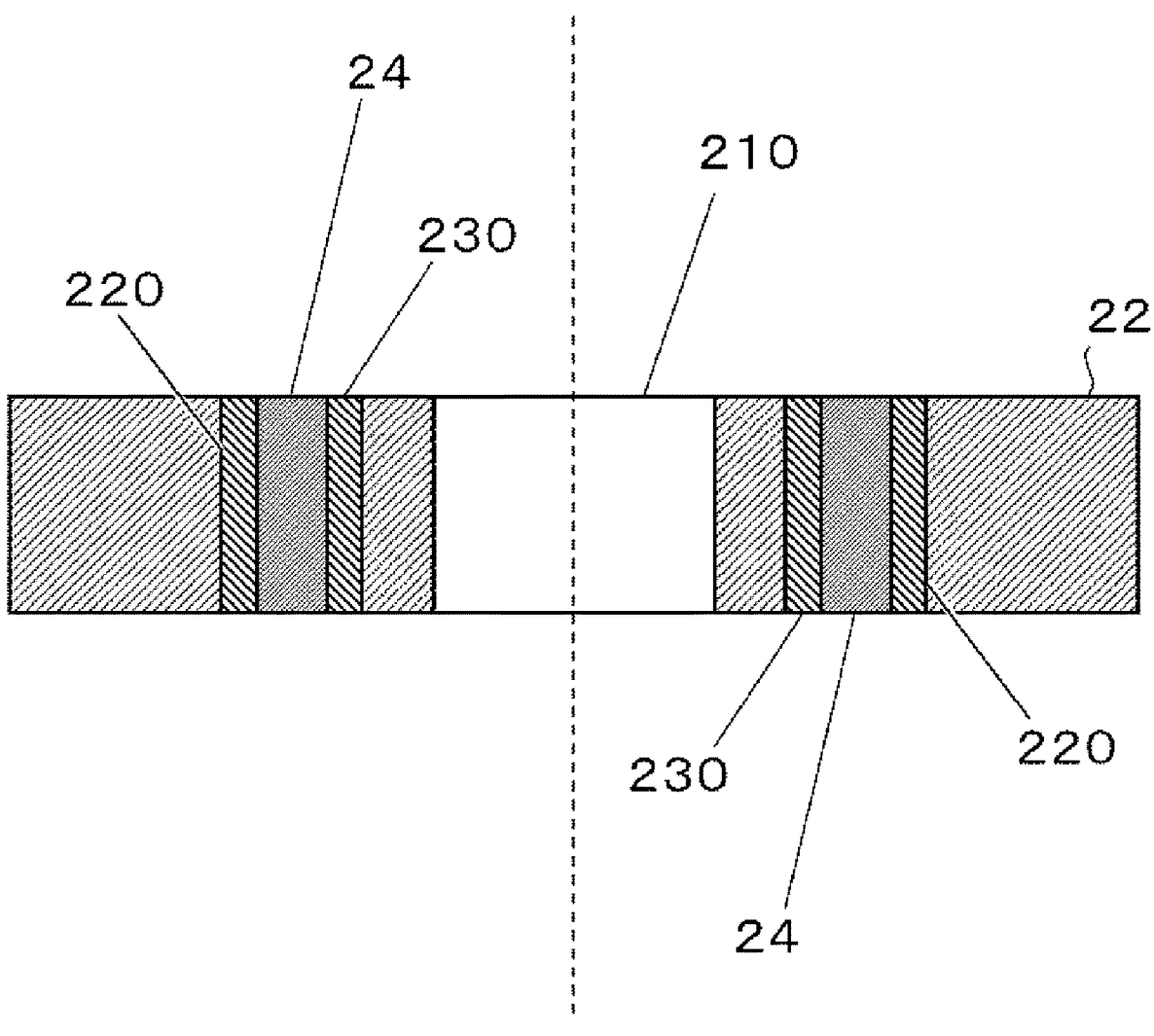
FIG. 2 schematically illustrates an example of a cross-sectional view of a rotor 20.

In the present embodiment, first, with reference to FIG. 1 and FIG. 2, an example of a method of producing, by using a rotor 20 removed from a motor 10, a reclaimed product 50 of the rotor 20 will be described. FIG. 1 schematically illustrates an example of a system configuration of a rotor manufacturing system 100. FIG. 2 schematically illustrates an example of a cross-sectional view of the rotor 20. For example, FIG. 2 schematically illustrates an example of a cross section A-A of the rotor 20 described in connection to FIG. 1.

(Overview of Each Unit of the Motor 10)

As illustrated in FIG. 1, in the present embodiment, the motor 10 includes, for example, a shaft 12, a stator 14, and the rotor 20. In the present embodiment, the rotor 20 includes, for example, a rotor core 22 and one or more permanent magnets 24.

As illustrated in FIG. 2, in the present embodiment, a through hole 210 and a through hole 220 which penetrate through the rotor core 22 are formed in the rotor core 22. In the present embodiment, a single through hole 210 and one or more through holes 220 are formed in the rotor core 22. In the present embodiment, a fixing member 230 for fixing a permanent magnet 24 to the rotor core 22 is arranged inside each of the one or more through holes 220.

In the present embodiment, the motor 10 is configured to convert electric energy into kinetic energy. The motor 10 may convert kinetic energy into electric energy. The motor 10 is mounted to a movable object including, for example, a power storage apparatus or a power generation apparatus. The motor 10 is used to drive the movable object by utilizing electrical power supplied from the power storage apparatus or the power generation apparatus, for example. The motor 10 generates electrical power at the time of regenerative braking of the movable object, for example.

Examples of the movable object include a vehicle, a marine vessel, a flight object, and the like. Examples of the vehicle include an automobile, a two-wheeled motor vehicle, a bicycle, a stand riding type vehicle having a power unit, and the like. Examples of the automobile include an electric automobile, a fuel cell automobile, a hybrid automobile, a small sized commuter, an electric cart, and the like. Examples of the two-wheeled motor vehicle include a motorcycle, a three-wheeled motorcycle, and the like. Examples of the marine vessel include a ship, a hovercraft, a water bike, a submarine, a submersible craft, an underwater scooter, and the like. Examples of the flight object include an aircraft, an airship or a balloon, a hot-air balloon, a helicopter, a drone, and the like.

In the present embodiment, the shaft 12 is arranged inside the through hole 210 of the rotor core 22. The shaft 12 is fixed to the rotor core 22 inside the through hole 210, and functions as a rotary shaft of the rotor 20.

In the present embodiment, the stator 14 retains the rotor 20 so as to be rotatable. The stator 14 has, for example, a substantially cylindrical shape. The stator 14 retains the rotor 20 such that, for example, an extension axis of the shaft 12 attached to the rotor 20 substantially matches with an extension axis of the stator 14. The stator 14 has, for example, a coil (not illustrated). The coil may be a three-phase coil of a U phase, a V phase, and a W phase.

In the present embodiment, the rotor 20 rotates inside the stator 14. As described above, the rotor core 22 of the rotor 20 and the shaft 12 are fixed to each other, and the shaft 12 is configured to also rotate when the rotor 20 rotates. Similarly, the rotor 20 is configured to also rotate when the shaft 12 rotates.

The rotor core 22 has, for example, a substantially disc-like shape. The rotor core 22 may contain a ferromagnetic material. The rotor core 22 is mainly formed of a ferromagnetic material, for example. In a case where the rotor core 22 contains a ferromagnetic material, when the permanent magnet 24 is attached to the through hole 220 of the rotor core 22, for example, after a molded body of a magnet material yet to be magnetized is inserted into the inside of the through hole 220, the magnet material is magnetized. Similarly, when the permanent magnet 24 is removed from the through hole 220 of the rotor core 22, for example, after the permanent magnet 24 is demagnetized or neutralized, the permanent magnet 24 that has been demagnetized or neutralized is removed from the through hole 220. Note that neutralization may be an example of demagnetization.

In the present embodiment, the permanent magnet 24 is arranged inside the through hole 220 of the rotor core 22. The permanent magnet 24 is fixed to the rotor core 22 by using the fixing member 230, for example. The molded magnet material is magnetized, and the permanent magnet 24 is thereby created, for example. A shape and a size of the permanent magnet 24 are not particularly limited, but the permanent magnet 24 has, for example, a columnar or plate-like shape. The permanent magnet 24 may have a thickness of 30 μm or more.

Examples of the permanent magnet 24 include a ceramic magnet, a metal magnet, a bond magnet, and the like. The permanent magnet 24 may be a sintered magnet. The ceramic magnet may be a ferrite magnet. Examples of the metal magnet include an alnico magnet, a rare earth magnet, and the like. Examples of the rare earth magnet include samarium-cobalt based magnet, a neodymium based magnet, and the like. Examples of the bond magnet include a rubber magnet, a plastic magnet, and the like.

The permanent magnet 24 may be a rare earth magnet. The permanent magnet 24 contains, for example, an R-T compound (R denotes a rare earth element, and T denotes a transition metal element). Examples of R include Sm, Nd, Pr, Ce, and the like. Examples of T include Co, Fe, and the like. The permanent magnet 24 may be an R-T based magnet. Examples of the R-T based magnet include a rare earth cobalt based magnet, an R-T-B based magnet, and the like. Examples of the rare earth cobalt based magnet include an SmCo based magnet. Examples of the R-T-B based magnet include an R—Fe—B based magnet. Examples of the R—Fe—B based magnet include an Nd—Fe—B based magnet. As described above, the above described magnet may be a sintered magnet. For example, an R-T based sintered magnet includes a main phase containing an R-T compound as a main component, and a grain boundary phase located at a grain boundary portion of the main phase.

The R-T based magnet contains, as main components, R and T. The SmCo based magnet contains, as main components, Sm and Co. The R-T-B based magnet contains, as main components, R, T, and B. The R—Fe—B based magnet contains, as main components, R, Fe, and B. The Nd—Fe—B based sintered magnet contains, as main components, Nd, Fe, and B.

In the present embodiment, the through hole 210 is formed at a center portion of the rotor core 22. The shaft 12 is arranged inside the through hole 210. In the present embodiment, the through hole 220 is formed at a position on a rim side of the rotor core 22 relative to the through hole 210. The permanent magnet 24 is arranged inside the through hole 220. In one embodiment, each of one or more permanent magnets 24 is housed in each of the one or more through holes 220. In another embodiment, a plurality of permanent magnets 24 are housed in a single through hole 220.

In the present embodiment, the fixing member 230 fixes the permanent magnet 24 arranged inside the through hole 220 to the rotor core 22. Examples of the fixing member 230 include (i) a resin material such as epoxy resin, (ii) a material a viscosity of which dramatically changes in response to a magnetic field, (iii) a material an elasticity modulus of which dramatically changes in response to the magnetic field, and the like.

Examples of the above described resin material include a material which has adhesiveness or tackiness and is to be embrittled in a demagnetization process of the permanent magnet 24 which will be described below. Examples of the material the viscosity of which dramatically changes in response to the magnetic field include a magnetorheological fluid (MRF), a magnetic fluid (MF), a magnetic compound fluid (MCF), and the like. Examples of the material the viscosity and/or elasticity of which dramatically changes in response to the magnetic field include a magnetic soft material or a magnetic elastomer. The magnetic soft material or the magnetic elastomer is a composite material of a polymer material such as polymer gel, rubber, or an elastomer, and a magnetic substance material such as a magnetic particle or a magnetic fluid.

The fixing member 230 may be a magnetorheological fluid (MRF), a magnetic fluid (MF), a magnetic compound fluid (MCF), or a magnetic soft material or a magnetic elastomer. For example, a physical property such as a viscosity of the magnetorheological fluid (which may be referred to as an MR fluid) changes according to the magnetic field from the outside. When the MR fluid is not applied with the magnetic field, the MR fluid exists in a liquid state with a small stress and viscosity. When the MR fluid is applied with an appropriate magnetic field, the stress or viscosity of the MR fluid increases according to a magnitude of the magnetic field, and the MR fluid changes into a semi-solid state. The magnetic fluid (MF), the magnetic compound fluid (MCF), and the magnetic soft material or the magnetic elastomer also have qualities similar to those of the MR fluid.

The magnetorheological fluid (MRF), the magnetic fluid (MF), the magnetic compound fluid (MCF), or the magnetic soft material or the magnetic elastomer is used as the fixing member 230, so that the permanent magnet 24 can be easily attached to the rotor core 22. Similarly, the permanent magnet 24 can be easily removed from the rotor core 22. (Overview of Each Unit of the Rotor Manufacturing System 100)

As illustrated in FIG. 1, in the present embodiment, the rotor manufacturing system 100 is configured to produce the reclaimed product 50 of the rotor 20. The reclaimed product 50 of the rotor 20 is used as a part of the motor 10, for example. In the present embodiment, the rotor manufacturing system 100 includes, for example, a demagnetization apparatus 110, a reproduction apparatus 120, an assembly apparatus 130, and a magnetization apparatus 140.

In the present embodiment, the rotor manufacturing system 100 is configured to produce the reclaimed product 50 of the rotor 20 by reusing the permanent magnet 24 incorporated in the rotor 20 which has been removed from the motor 10. When the permanent magnet 24 incorporated in the rotor 20 is to be reused, before the permanent magnet 24 is removed from the rotor 20, it is conceivable to neutralize the permanent magnet 24. Thus, removal of the permanent magnet 24 from the rotor 20 is facilitated. In addition, adhesion of a small ferromagnetic substance onto a surface of the permanent magnet 24 removed from the rotor 20 is suppressed. Thus, product management of the removed permanent magnet 24 is facilitated.

For example, by heat-treating the permanent magnet 24 at a high temperature, a large number of permanent magnets 24 can be neutralized in a short period of time. However, when the permanent magnet 24 is heat-treated at a high temperature, the surface of the permanent magnet 24 is oxidized, and as a result, magnet performance of the reused permanent magnet 24 falls. Examples of the magnet performance include a magnetic property, a mechanical strength, and the like. Examples of the magnetic property include a coercivity. Examples of the mechanical strength include a bending stress.

For a purpose of avoiding the oxidation of the magnet material at the time of the heat treatment, the heat treatment may be performed under a vacuum atmosphere, under an inert atmosphere by Ar gas, or under a neutral atmosphere by $N_2$ gas. However, it is found out by inventors et al. of this application that even when the heat treatment of the magnet material is performed under a vacuum atmosphere, under an inert atmosphere, or under a neutral atmosphere, as a temperature at the time of the heat treatment increases, a thickness of an oxidation layer to be formed on the surface of the magnet material increases. It is also found out that as at least one time to perform the heat treatment on the magnet material increases, the coercivity and the bending stress of the heat-treated magnet material fall.

In view of the above, in the present embodiment, demagnetization or neutralization of the permanent magnet 24 (which may be simply referred to as demagnetization) is to be performed under a reducing atmosphere. Thus, the increase in the thickness of the oxidation layer due to the heat treatment is suppressed. As a result, the fall in the magnet performance of the reused permanent magnet 24 is suppressed. In addition, the number of times to reuse the permanent magnet 24 can be increased. When the number of times to reuse the permanent magnet 24 is increased, a scarce rare earth element can be effectively utilized, and an amount of $CO_2$ to be emitted due to fabrication of the permanent magnet 24 can be suppressed.

In the present embodiment, the demagnetization apparatus 110 is configured to heat the rotor 20 removed from the motor 10 under a reducing atmosphere, and demagnetize the permanent magnet 24 arranged in the rotor 20. The demagnetization apparatus 110 is configured to cool the heated rotor 20. The demagnetization apparatus 110 may cool the heated rotor 20 under a reducing atmosphere. A detail of the demagnetization apparatus 110 will be described below.

According to the present embodiment, the demagnetized permanent magnet 24 (which may be referred to as a molded body 34) is to be removed from the rotor 20 heated and cooled by the demagnetization apparatus 110. Thus, the rotor 20 is separated into the rotor core 22 and the molded body 34. According to the present embodiment, the molded body 34 is to be fed to the reproduction apparatus 120, and the rotor core 22 is to be fed to the assembly apparatus 130.

In the present embodiment, the molded body 34 has a dimension approximately equivalent to the permanent magnet 24 yet to be heat-treated. A main component of the molded body 34 has a composition approximately equivalent to a main component of the permanent magnet 24 yet to be heat-treated. For example, when the permanent magnet 24 is an R-T based magnet, the molded body 34 contains, as main components, a rare earth element and a transition metal. A residual magnetic flux of the molded body 34 may be 10 mT or less.

In the present embodiment, the molded body 34 has a thickness of 30 μm or more. As described above, the molded body 34 is created by heating the permanent magnet 24 under a reducing atmosphere. Therefore, a content of a substance contained in a reducing atmosphere (which may be referred to as a reducing substance) may vary in a vicinity of a surface of the molded body 34 and in a vicinity of a center of the molded body 34.

For example, a ratio of (b) a concentration of the reducing substance in a region within 10 μm from the surface of the molded body 34 (which may be referred to as a surface layer region) to (a) a concentration of the reducing substance in a region which is arranged in a position away from the surface of the molded body 34 by more than 10 μm and which has a thickness of 10 μm (which may be referred to as an interior region) is 1.1 or more. When the above described ratio is 1.1 or more, for example, it is presumed that demagnetization treatment of the molded body 34 is performed under a reducing atmosphere. As described above, since the demagnetization treatment of the molded body 34 is performed under a reducing atmosphere, the fall in the magnet performance when the molded body 34 is reused as the permanent magnet 24 may be suppressed.

In the present embodiment, the reproduction apparatus 120 is configured to apply the molded body 34 with treatment for reutilizing the molded body 34 as the permanent magnet 24 when necessary. For example, the reproduction apparatus 120 adjusts a state of the surface of the molded body 34. Thus, the reproduction apparatus 120 can reutilize the molded body 34 as the permanent magnet 24 without melting or milling the molded body 34.

In the present embodiment, the reproduction apparatus 120 includes, for example, an inspection apparatus (not illustrated) configured to inspect the molded body 34 removed from the rotor core 22. The reproduction apparatus 120 includes, for example, a surface treatment apparatus (not illustrated) configured to apply surface treatment to the molded body 34. For example, the surface treatment apparatus applies the surface treatment to the molded body 34 which is determined by an inspection apparatus to require the surface treatment.

More specifically, first, the reproduction apparatus 120 inspects a state of the molded body 34. When the state of the molded body 34 is satisfactory, the reproduction apparatus 120 feeds the above described molded body 34 to the assembly apparatus 130 as a reclaimed material 44. On the other hand, when the state of the molded body 34 is not satisfactory and also the molded body 34 is reusable as the permanent magnet 24 by the surface treatment of the molded body 34, the reproduction apparatus 120 applies the surface treatment to the molded body 34. The reproduction apparatus 120 feeds the surface-treated molded body 34 to the assembly apparatus 130 as the reclaimed material 44. A detail of the treatment in the reproduction apparatus 120 will be described below.

In the present embodiment, the assembly apparatus 130 is configured to attach the reclaimed material 44 to the rotor core 22. For example, the assembly apparatus 130 inserts the reclaimed material 44 and the fixing member 230 to the through hole 220 of the rotor core 22.

In the present embodiment, the magnetization apparatus 140 is configured to magnetize the reclaimed material 44 attached to the through hole 220 of the rotor core 22. Thus, the reclaimed material 44 is magnetized, and the reclaimed product 50 of the rotor 20 including the rotor core 22 and the permanent magnet 24 is created.

The permanent magnet 24 may be an example of a permanent magnet that is molded. The molded body 34 may be an example of a magnet material that is molded. The reclaimed material 44 may be an example of the magnet material that is molded. The reclaimed product 50 may be an example of a rotor to which a magnet material is attached or another rotor. The demagnetization apparatus 110 may be an example of a heating furnace.

Example of Another Embodiment

In the present embodiment, the detail of the motor 10 has been described while a case where the motor 10 is mounted to the movable object is used as an example. However, the motor 10 is not limited to the present embodiment. In another embodiment, the motor 10 may be used for any application.

In the present embodiment, the detail of the rotor 20 has been described while a case where the one or more through holes 220 are formed in the rotor core 22 is used as an example. However, the rotor 20 is not limited to the present embodiment. In another embodiment, instead of the through hole 220, a recess or a depressed portion which does not penetrate through the rotor core 22 is formed in the rotor core 22. In this case, the permanent magnet 24 is housed in the above described recess or depressed portion, and the permanent magnet 24 is attached to the rotor core 22.

Figure 3:
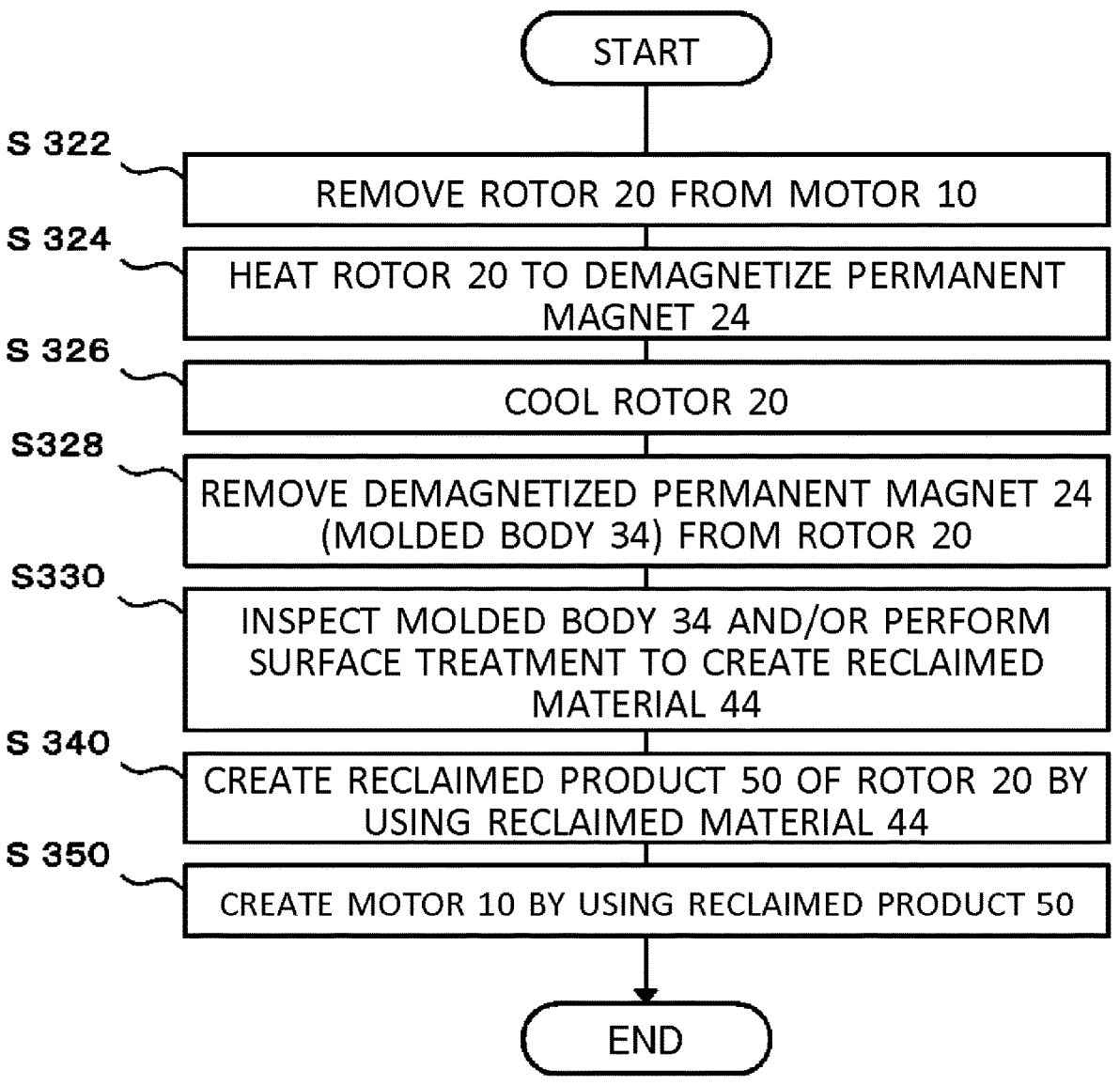
FIG. 3 schematically illustrates an example of a method of producing a motor 10.

FIG. 3 schematically illustrates an example of a method of producing the motor 10. With reference to FIG. 3, an example of a method of producing the new motor 10 by reutilizing some of parts of the used motor 10 will be described. According to the present embodiment, the rotor 20 included in the motor 10 is to be reutilized. More specifically, when it is determined that the permanent magnet 24 incorporated in the rotor 20 is reusable, the above described permanent magnet 24 is reutilized as the permanent magnet 24 without being milled at 5 μm or less or being melted.

According to the present embodiment, first, in step 322 (step may be abbreviated as S), the used motor 10 is prepared. The rotor 20 is removed from the motor 10. Thus, the rotor 20 to be a reutilized target is prepared. As described above, the one or more permanent magnets 24 are incorporated in the rotor 20.

Then, in S324, the demagnetization apparatus 110 heats the rotor 20. The demagnetization apparatus 110 heats the rotor 20 by atmosphere heat treatment. For example, first, the rotor 20 is arranged inside a heating furnace (which is not illustrated in FIG. 1 and a detail thereof will be described below) of the demagnetization apparatus 110. Thus, the permanent magnet 24 is arranged inside the heating furnace. Then, the demagnetization apparatus 110 adjusts an atmosphere inside the heating furnace. Subsequently, the demagnetization apparatus 110 raises a temperature inside the heating furnace. By appropriately adjusting the temperature (which may be referred to as an atmosphere temperature) inside the heating furnace and a treating time period in the heat treatment, the demagnetization apparatus 110 can demagnetize the permanent magnet 24 by thermal demagnetization in an irreversible manner. The demagnetization apparatus 110 may neutralize the permanent magnet 24. As described above, neutralization may be an example of demagnetization.

In the present embodiment, the demagnetization apparatus 110 heats the permanent magnet 24 incorporated in the rotor 20 such that a residual magnetic flux of the permanent magnet 24 that has been heat-treated (that is, the molded body 34) becomes 10 mT or less. Thus, removal of the molded body 34 from the through hole 220 of the rotor core 22 is facilitated. In addition, for example, in a storage process, a conveyance process, or the surface treatment process of the molded body 34, adhesion of the ferromagnetic substance onto the surface of the molded body 34 is suppressed.

The demagnetization apparatus 110 may heat the permanent magnet 24 incorporated in the rotor 20 such that by heat treatment up to 24 hours, the residual magnetic flux of the permanent magnet 24 after the heat treatment becomes 10 mT or less. Thus, throughput is improved.

In the present embodiment, the demagnetization apparatus 110 heats the permanent magnet 24 incorporated in the rotor 20 in the presence of a reducing substance. The demagnetization apparatus 110 may heat the permanent magnet 24 under a reducing atmosphere. According to the present embodiment, a substance having a reducing property stronger than nitrogen molecules is used as the above described reducing substance.

As described above, the oxidation layer (which may be referred to as a surface oxidation layer) is formed on the surface of the permanent magnet 24 due to the heat treatment of the permanent magnet 24. According to the present embodiment, the heat treatment of the permanent magnet 24 is performed in the presence of the reducing substance having the reducing property stronger than nitrogen molecules. Thus, formation of the surface oxidation layer is largely suppressed. As a result, by the above described heat treatment, the molded body 34 with a small thickness of the surface oxidation layer is created.

The reducing substance may be a molecule or a compound which does not contain oxygen. Thus, oxidation of the permanent magnet 24 is suppressed. The reducing substance may be a substance other than hydrogen molecules. Thus, hydrogen embrittlement of the permanent magnet 24 is suppressed. Note that the reducing substance may contain, as inevitable impurities, oxygen and/or hydrogen molecules. Examples of the reducing substance include at least one selected from among solid carbon, carbon monoxide, hydrocarbon, hydrogen sulfide, and sulfur dioxide. Examples of solid carbon include graphite, carbon black, carbon nanotube, carbon fiber, and the like.

The reducing substance may be solid carbon and/or carbon monoxide. Solid carbon and/or carbon monoxide has small corrosiveness or brittleness against a metal as compared with hydrogen molecules, hydrogen sulfide, or sulfur dioxide. The reducing substance may be carbon monoxide. Carbon monoxide is easy to handle, and a carbon monoxide concentration in a heated atmosphere can be precisely controlled.

A form of the reducing substance to be supplied to the inside of the heating furnace may be a gaseous matter, may be a liquid matter, or may be a solid matter. The reducing substance during a period in which the heat treatment of the permanent magnet 24 is performed is contained as a gaseous matter in a gas (which may be referred to as an atmosphere gas) in the heating furnace, for example.

In one embodiment, a supply source of the reducing substance is arranged outside the heating furnace, and the gaseous reducing substance is supplied to the inside of the heating furnace from the above described supply source. Thus, the gas present inside the heating furnace is purged, and the inside of the heating furnace is filled with the reducing atmosphere gas. Note that before the reducing substance is supplied to the inside of the heating furnace, the inside of the heating furnace may be adjusted to a vacuum state or a low pressure state. Thus, an oxygen concentration in the atmosphere gas can be further decreased.

In another embodiment, the solid or liquid reducing substance is arranged inside the heating furnace, and as a temperature of the heating furnace rises, the above described reducing substance further evaporates. Thus, the gas present inside the heating furnace is purged, and the inside of the heating furnace is filled with the reducing atmosphere gas. Note that before the heating of the heating furnace is started or before the temperature in the heating furnace reaches a predetermined temperature, the inside of the heating furnace may be adjusted to a vacuum state or a low pressure state. Thus, the oxygen concentration in the atmosphere gas can be further decreased.

During a period in which the heat treatment of the permanent magnet 24 is performed, at least a part of the reducing substance may exist as a solid matter on the surface of the permanent magnet 24. For example, before the permanent magnet 24 is arranged inside the heating furnace or before the temperature of the heating furnace reaches the predetermined temperature, the solid reducing substance may be applied or sprayed to the surface of the permanent magnet 24. Subsequently, the demagnetization apparatus 110 raises the temperature inside the heating furnace to a temperature for demagnetizing the permanent magnet 24. Thus, the formation of the oxidation layer on the surface of the permanent magnet 24 is suppressed.

(Composition of the Atmosphere Gas)

In the present embodiment, the atmosphere inside the heating furnace is adjusted to a reducing atmosphere with a stronger reducing property than that of a neutral gas atmosphere in which a concentration of nitrogen gas is 99.9% or more. Thus, the formation of the oxidation layer on the surface of the permanent magnet 24 is suppressed.

A concentration of the reducing substance in the atmosphere gas may be 99.9% or more. The concentration of the reducing substance may be measured by a sensor configured to measure a concentration of a reducing substance, or may be derived based on an indicated value of an oximeter. For example, carbon monoxide gas is supplied to the inside of the heating furnace such that an oxygen concentration in the atmosphere gas becomes 0.1% or less. At this time, the concentration of carbon monoxide in the atmosphere gas is approximately 99.9% or more. Thus, the atmosphere inside the heating furnace is adjusted to the reducing atmosphere with the stronger reducing property than that of the neutral gas atmosphere in which the concentration of nitrogen gas is 99.9% or more.

A concentration of oxygen in the atmosphere gas may be 0.1% or less. For example, the atmosphere inside the heating furnace is adjusted such that a partial pressure of oxygen becomes 1 kPa or less. The atmosphere inside the heating furnace may be adjusted such that the partial pressure of oxygen becomes 500 Pa or less, the atmosphere inside the heating furnace may be adjusted such that the partial pressure of oxygen becomes 100 Pa or less, or the atmosphere inside the heating furnace may be adjusted such that the partial pressure of oxygen becomes less than 100 Pa. As described above, oxygen may be contained in the atmosphere gas as inevitable impurities. In view of the above, the atmosphere inside the heating furnace is adjusted such that the partial pressure of oxygen becomes 0 Pa or more and 1 kPa or less, for example. The atmosphere inside the heating furnace may be adjusted such that the partial pressure of oxygen exceeds 0 Pa and becomes 1 kPa or less. The atmosphere inside the heating furnace may be adjusted such that the partial pressure of oxygen becomes 0 Pa or more and 500 Pa or less, or the atmosphere inside the heating furnace may be adjusted such that the partial pressure of oxygen becomes 0 Pa or more and 100 Pa or less. Thus, the formation of the oxidation layer on the surface of the permanent magnet 24 is further suppressed.

A concentration of hydrogen in the atmosphere gas may be 0.1% or less. For example, the atmosphere inside the heating furnace is adjusted such that a partial pressure of hydrogen becomes 1 kPa. The atmosphere inside the heating furnace may be adjusted such that the partial pressure of hydrogen becomes 500 Pa or less, the atmosphere inside the heating furnace may be adjusted such that the partial pressure of hydrogen becomes 100 Pa or less, or the atmosphere inside the heating furnace may be adjusted such that the partial pressure of hydrogen becomes less than 100 Pa. As described above, hydrogen may be contained in the atmosphere gas as inevitable impurities. In view of the above, the atmosphere inside the heating furnace is adjusted such that the partial pressure of hydrogen becomes 0 Pa or more and 1 kPa or less, for example. The atmosphere inside the heating furnace may be adjusted such that the partial pressure of hydrogen exceeds 0 Pa and becomes 1 kPa or less. The atmosphere inside the heating furnace may be adjusted such that the partial pressure of hydrogen becomes 0 Pa or more and 500 Pa or less, or the atmosphere inside the heating furnace may be adjusted such that the partial pressure of hydrogen becomes 0 Pa or more and 100 Pa or less. Thus, the hydrogen embrittlement of the permanent magnet 24 is further suppressed.

(Conditions of Heat Treatment)

(Lower Limit Value of Heat Treatment Temperature)

An extent of the demagnetization of the permanent magnet 24 is decided by a temperature of the heat treatment and a treating time period. After the permanent magnet 24 is heated to a temperature equal to or more than a Curie temperature (which may also be referred to as a Curie point), when the permanent magnet 24 is cooled to a room temperature, for example, the permanent magnet 24 is neutralized. On the other hand, in a case where the permanent magnet 24 is not heated to the Curie temperature, when the treating time period of the heat treatment is relatively short, in a course of the cooling of the permanent magnet 24 to the room temperature, for example, the magnetic property of the permanent magnet 24 may return to a state before the heat treatment (which may be referred to as reversible demagnetization). However, depending on a temperature and a time period of heat treatment, after the heat treatment, even when the permanent magnet 24 is cooled to the room temperature, for example, the magnetic property of the permanent magnet 24 may not to be sufficiently returned (which may be referred to as irreversible demagnetization).

According to one embodiment of S324, the demagnetization apparatus 110 heats the permanent magnet 24 such that a residual magnetic flux of the molded body 34 created when the heated permanent magnet 24 is cooled becomes 10 mT or less. A temperature and a treating time period of the heat treatment of the demagnetization apparatus 110 are decided by an experiment carried out in advance or the like such that the residual magnetic flux of the molded body 34 becomes 10 mT or less.

For example, such a combination of the heat treatment temperature and the treating time period is decided by the experiment carried out in advance that the residual magnetic flux of the molded body 34 becomes 10 mT or less. For example, after the permanent magnet 24 is arranged inside the heating furnace and the atmosphere inside the heating furnace is adjusted, the demagnetization apparatus 110 maintains the temperature inside the heating furnace to be a first temperature or more for at least a first period. The above described first temperature and first period are decided based on any reference from among combinations of the heat treatment temperature and the treating time period described above. For example, a combination of the first temperature and the first period is decided such that the first period becomes 24 hours or less. Thus, the first temperature and the first period may be decided such that the residual magnetic flux of the molded body 34 becomes 10 mT or less.

According to another embodiment of S324, the demagnetization apparatus 110 heats the permanent magnet 24 such that the temperature of the permanent magnet 24 becomes 250° C. or more. The demagnetization apparatus 110 may heat the permanent magnet 24 such that a temperature in the vicinity of a center of the permanent magnet 24 becomes 250° C. or more. Thus, by adjusting the treating time period of the heat treatment, permanent magnets of a large number of types can be irreversibly demagnetized. The demagnetization apparatus 110 may heat the permanent magnet 24 such that the temperature in the vicinity of the center of the permanent magnet 24 becomes 300° C. or more. Thus, by adjusting the treating time period of the heat treatment, an R—Fe—B based magnet can be irreversibly demagnetized.

For example, the demagnetization apparatus 110 adjusts the temperature of the atmosphere inside the heating furnace to be 250° C. or more. The demagnetization apparatus 110 may adjust the temperature of the atmosphere inside the heating furnace to be 280° C. or more, may adjust the temperature to be 300° C. or more, may adjust the temperature to be 330° C. or more, may adjust the temperature to be 350° C. or more, or may adjust the temperature to be 400° C. or more. Thus, the heat treating time period can be shortened. As a result, the throughput is improved. In this case, the treating time period of the heat treatment is decided by an experiment carried out in advance, for example.

According to still another embodiment of S324, the demagnetization apparatus 110 heats the permanent magnet 24 such that the temperature of the permanent magnet 24 becomes the Curie temperature of the permanent magnet 24 or more. The demagnetization apparatus 110 may heat the permanent magnet 24 such that the temperature in the vicinity of the center of the permanent magnet 24 becomes the Curie temperature of the permanent magnet 24 or more.

For example, a Curie temperature of an SmCo based magnet is approximately 700 to 800° C. A Curie temperature of an Nd—Fe—B based magnet is approximately 300° C.

For example, the demagnetization apparatus 110 adjusts the temperature of the atmosphere inside the heating furnace to be the Curie temperature of the permanent magnet 24 or more. As described above, after the permanent magnet 24 is heated to the Curie temperature or more, when the permanent magnet 24 is cooled to approximately a room temperature, the permanent magnet 24 is neutralized. Therefore, in this case, the treating time period of the heat treatment may be relatively short. The treating time period of the heat treatment is decided based on a thermal conductivity of the permanent magnet 24 and a dimension of the permanent magnet 24, for example. The treating time period of the heat treatment may be decided based on heat transfer coefficients of the atmosphere gas and the permanent magnet 24, the thermal conductivity of the permanent magnet 24, and the dimension of the permanent magnet 24. The treating time period of the heat treatment may be decided by an experiment carried out in advance.

(Upper Limit Value of Heat Treatment Temperature)

In the present embodiment, the demagnetization apparatus 110 heats the permanent magnet 24 such that the temperature of the permanent magnet 24 becomes lower than a melting point of a component with a lowest melting point among main components of the permanent magnet 24 (which may be referred to as a low melting point main component). The demagnetization apparatus 110 may heat the permanent magnet 24 such that a temperature of the surface of the permanent magnet 24 becomes lower than the melting point of the low melting point main component of the permanent magnet 24. For example, the demagnetization apparatus 110 adjusts the temperature inside the heating furnace to a temperature lower than the melting point of the low melting point main component of the permanent magnet 24. Thus, the demagnetization apparatus 110 can demagnetize the permanent magnet 24 while a shape of the permanent magnet 24 is maintained.

Then, in S326, the demagnetization apparatus 110 cools the rotor 20. For example, the demagnetization apparatus 110 cools the rotor 20 to a room temperature. Thus, the permanent magnet 24 incorporated in the rotor 20 is demagnetized to create the molded body 34.

According to the present embodiment, the molded body 34 is created without milling or melting the permanent magnet 24. In addition, the molded body 34 is created without molding a raw material of the magnet at a pressure of 1000 kgf/cm or more. Thus, the amount of $CO_2$ emitted due to the fabrication of the magnet material yet to be magnetized is largely reduced.

Then, in S328, the molded body 34 is removed from the rotor 20. Thus, the rotor core 22 and the molded body 34 are separated. As described above, the molded body 34 is fed to the reproduction apparatus 120. On the other hand, the rotor core 22 is fed to the assembly apparatus 130.

When the permanent magnet 24 is demagnetized by the heat treatment in the demagnetization apparatus 110 to become the molded body 34, a force for the fixing member 230 to fix the rotor core 22 and the permanent magnet 24 is weakened. Thus, for example, when the MR fluid or the like is used as the fixing member 230 or when the rotor core 22 is mainly formed of a ferromagnetic substance, the molded body 34 can be easily removed from the rotor core 22 as compared with a case where the permanent magnet 24 is removed from the rotor core 22. In addition, in a case where the fixing member 230 is incinerated or embrittled by the heat treatment in the demagnetization apparatus 110, the molded body 34 can be easily removed from the rotor core 22 as compared with a case where the permanent magnet 24 is removed from the rotor core 22 before the heat treatment.

Then, in S330, the reclaimed material 44 is created. For example, the reproduction apparatus 120 inspects a state of the molded body 34. When the state of the molded body 34 is satisfactory, the reproduction apparatus 120 feeds the above described molded body 34 to the assembly apparatus 130 as the reclaimed material 44. On the other hand, when the state of the molded body 34 is not satisfactory and also the molded body 34 is reusable as the permanent magnet 24 by the surface treatment of the molded body 34, the reproduction apparatus 120 applies the surface treatment to the molded body 34. The reproduction apparatus 120 feeds the surface-treated molded body 34 to the assembly apparatus 130 as the reclaimed material 44.

As described above, by the heat treatment in S324, the oxidation layer is formed on the surface of the molded body 34. In view of the above, the surface of the molded body 34 is treated, so that it becomes possible to reutilize the molded body 34 as the material of the permanent magnet 24. A detail of the above described inspection and surface treatment will be described below.

Then, in S340, the reclaimed product 50 of the rotor 20 is created. In the present embodiment, the reclaimed product 50 of the rotor 20 is created by using the reclaimed material 44. The reclaimed product 50 of the rotor 20 includes, for example, the rotor core 22, and the permanent magnet 24 obtained by magnetizing the reclaimed material 44.

For example, first, the assembly apparatus 130 attaches the reclaimed material 44 to the rotor 20. Specifically, the reclaimed material 44 is attached to the through hole 220 of the rotor core 22 of the rotor 20. The rotor core 22 to which the reclaimed material 44 is to be attached may be the rotor core 22 to which the permanent magnet 24 yet to become the reclaimed material 44 was attached, or may be another rotor core 22.

Then, the magnetization apparatus 140 magnetizes the reclaimed material 44 attached to the rotor 20. Thus, the reclaimed material 44 is magnetized to become the permanent magnet 24. In addition, when the MR fluid or the like is used as the fixing member 230 or when the rotor core 22 is mainly formed of the ferromagnetic substance, the rotor core 22 and the permanent magnet 24 are fixed by the fixing member 230.

Then, in S350, the motor 10 is created. In the present embodiment, the motor 10 is created by using the reclaimed product 50 of the rotor 20. The motor 10 includes, for example, the shaft 12, the stator 14, and the reclaimed product 50 of the rotor 20.

For example, first, the shaft 12 is attached to the reclaimed product 50 of the rotor 20. Then, the reclaimed product 50 to which the shaft 12 has been attached is attached to the stator 14. Thus, the motor 10 is created.

S324 may be an example of a demagnetization step. S324 may be an example of an arrangement step, a gas adjustment step, a deoxidation step, a temperature adjustment step, or a heating step. S326 may be an example of a cooling step. S328 may be an example of a removal step. S330 may be an example of a surface treatment step. S340 may be an example of an attachment step or a magnetization step.

A process including S324 and S326 may be an example of a method of producing a magnet material. A process including S324 to S340 may be an example of a method of producing a rotor of an electric motor. A process including S324 to S350 may be an example of a method of producing an electric motor.

Example of Another Embodiment

In the present embodiment, the detail of the method of producing the molded body 34, the method of producing the reclaimed product 50, or the method of producing the motor 10 has been described while a case is used as an example where the rotor 20 is removed from the used motor 10, so that the rotor 20 or the permanent magnet 24 which is set as a reutilization target is prepared. However, a procedure in which the rotor 20 or the permanent magnet 24 which is set as the reutilization target is prepared is not limited to the present embodiment. In another embodiment, a user of the rotor manufacturing system 100 obtains the rotor 20 removed from the motor 10 used by a third party from the third party, so that the rotor 20 or the permanent magnet 24 which is set as the reutilization target is prepared.

Figure 4:
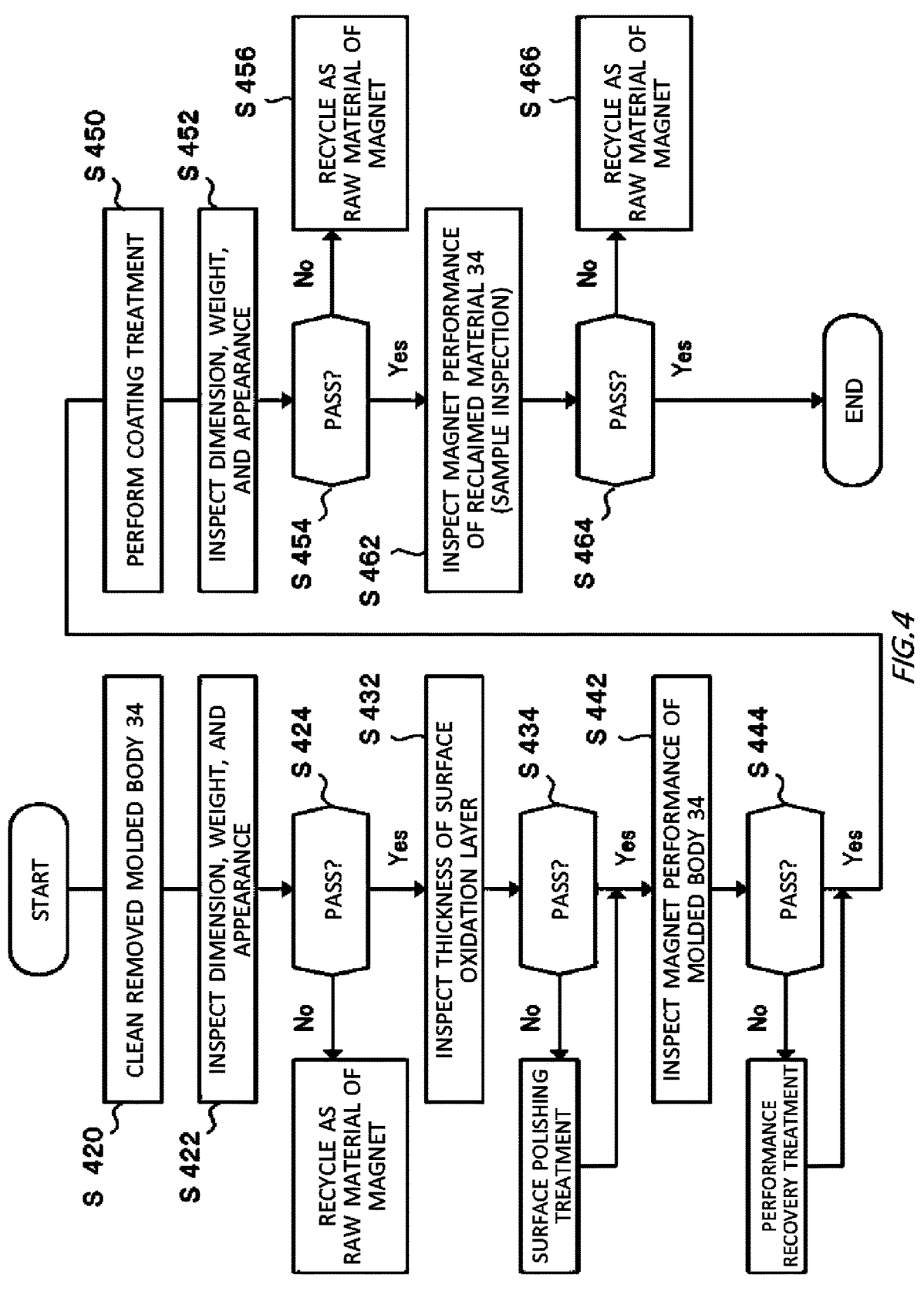
FIG. 4 schematically illustrates an example of a method of creating a reclaimed material 44.

FIG. 4 schematically illustrates an example of a method of creating the reclaimed material 44. With reference to FIG. 4, an example of S330 described in connection to FIG. 3 will be specifically described.

According to the present embodiment, first, in S420, the molded body 34 removed from the rotor core 22 is cleaned. Thus, the fixing member 230 remaining on the surface of the molded body 34 is removed. Then, in S422, a dimension, a weight, and/or an appearance of the molded body 34 is inspected.

In S424, an inspection result of the molded body 34 and a reference related to the dimension, the weight, and/or the appearance are compared. When the inspection result of the molded body 34 does not satisfy the reference related to the dimension, the weight, and/or the appearance (in the case of No in S424), in S426, the molded body 34 is recycled as a raw material of a magnet. Specifically, for example, the molded body 34 is milled to recover a rare earth element, a transition metal element, or the like contained in powder is recovered.

On the other hand, when the inspection result of the molded body 34 satisfies the reference related to the dimension, the weight, and/or the appearance (in the case of Yes in S424), in S432, a state of the surface of the molded body 34 is inspected. For example, a thickness of the oxidation layer formed on the surface of the molded body 34 is measured. The above described thickness of the oxidation layer is decided by observing a surface layer structure and/or an element concentration distribution of a sample collected from a central or corner part of a surface layer of the molded body 34 by using an electron beam probe microanalyzer (EPMA) or a scanning electron microscopy (SEM), for example. For a single sample, for example, the thickness of the oxidation layer at one to three positions is measured. The above described thickness of the oxidation layer is decided by averaging measured values of one to three samples, for example.

In 434, a measurement result of the surface oxidation layer of the molded body 34 and a reference related to a thickness of the surface oxidation layer are compared. When the measurement result of the surface oxidation layer of the molded body 34 does not satisfy the reference related to the thickness of the surface oxidation layer (in the case of No in S434), in S436, surface polishing treatment is performed. Specifically, the surface of the molded body 34 is polished to remove the surface oxidation layer. For example, the surface of the molded body 34 is polished such that the thickness of the surface oxidation layer becomes less than 2.0 mm.

On the other hand, when the measurement result of the surface oxidation layer of the molded body 34 satisfies the reference related to the thickness of the surface oxidation layer (in the case of Yes in S434), in S442, performance of the molded body 34 is inspected. For example, magnetization treatment is applied to a part of the plurality of molded bodies 34 which are simultaneously treated. The magnet performance of the magnetized molded body 34 is inspected. For example, the magnet performance such as a maximum energy product, a residual magnetic flux density, or a coercivity is inspected by using a magnetic property measurement apparatus (which may be referred to as BH curve tracer).

In S444, the inspection result of the molded body 34 and the reference related to the magnet performance are compared. When the inspection result of the molded body 34 does not satisfy the reference related to the magnet performance (in the case of No in S444), in S446, performance recovery treatment is performed. Specifically, diffusion treatment of Td, Dy, or the like is performed.

According to one embodiment, first, the molded body 34 set as a target of the performance recovery treatment is immersed in a compound of Dy or Tb which has been liquified. The above described compound of Dy or Tb may be applied to the surface of the molded body 34 set as a target of the performance recovery treatment. Thus, a film of the compound of Dy or Tb is formed on the surface of the molded body 34. Then, the heat treatment is applied to the molded body 34. Thus, the compound of Dy or Tb is decomposed, and Dy or Tb is diffused to the inside or grain boundary of the molded body 34. According to another embodiment, first, the molded body 34 set as the target of the performance recovery treatment and the compound of Dy or Tb are arranged inside a vacuum vessel. Then, the inside of the vacuum vessel is heated. Thus, vapor containing Dy or Tb is generated, and Dy or Tb is diffused to the inside or grain boundary of the molded body 34.

On the other hand, when the inspection result of the molded body 34 satisfies the reference related to the magnet performance (in the case of Yes in S444), in S450, coating treatment of the molded body 34 is performed. For example, a layer of a rust preventive material is formed on the surface of the molded body 34. Examples of the rust preventive material include Ni, Al, a resin material, and the like. Examples of the resin material include epoxy resin. In addition, in 452, a dimension, a weight, and/or an appearance of the molded body 34 after the coating is inspected.

In 454, an inspection result of the molded body 34 after the coating and a reference related to the dimension, the weight, and/or the appearance are compared. When the inspection result of the molded body 34 after the coating does not satisfy the reference related to the dimension, the weight, and/or the appearance (in the case of No in S454), in S456, the molded body 34 after the coating is recycled as a raw material of a magnet. For example, through a procedure similar to S426, the molded body 34 after the coating is recycled as a raw material of a magnet.

On the other hand, when the inspection result of the molded body 34 after the coating satisfies the reference related to the dimension, the weight, and/or the appearance (in the case of Yes in S454), in S462, sample inspection is performed. In the sample inspection, the magnet performance of the molded body 34 is inspected. The inspection related to the magnet performance is performed, for example, through a procedure similar to the inspection described in connection to S442.

In S464, the inspection result of the molded body 34 and the reference related to the magnet performance are compared. When the inspection result of the molded body 34 does not satisfy a reference related to the magnet performance (in the case of No in S464), in S466, the molded bodies 34 with a same lot as the molded body 34 set as the inspection target are recycled as a raw material of a magnet. For example, through a procedure similar to S426, the above described molded bodies 34 are recycled as a raw material of a magnet.

On the other hand, when the inspection result of the molded body 34 satisfies the reference related to the magnet performance (in the case of Yes in S464), the molded bodies 34 with the same lot as the molded body 34 set as the inspection target are fed to the assembly apparatus 130 as the reclaimed material 44. Thus, the process of producing the reclaimed material 44 is ended.

S436 may be an example of a surface treatment step. S446 may be an example of the surface treatment step. S450 may be an example of the surface treatment step.

Figure 5:
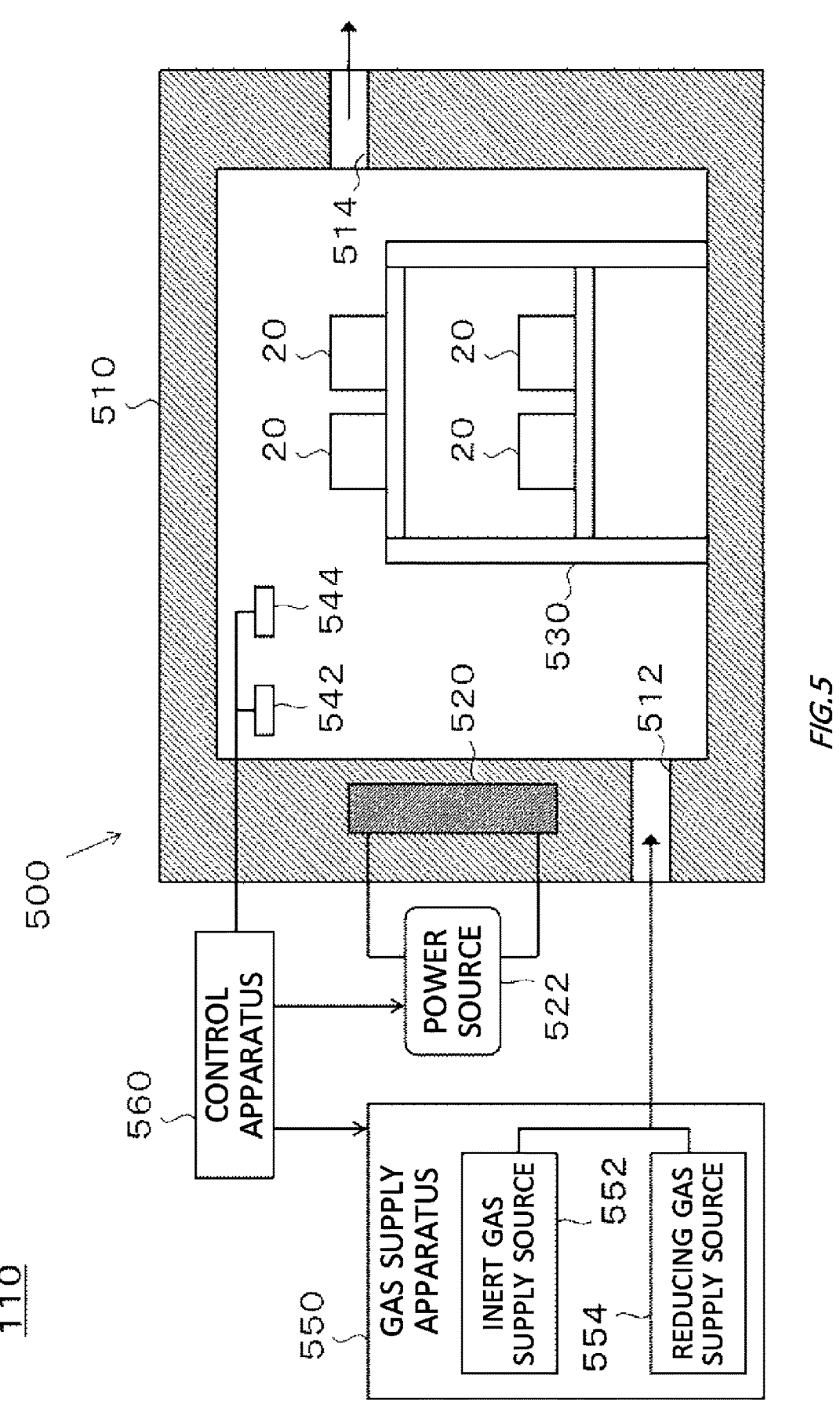
FIG. 5 schematically illustrates an example of a system configuration of a demagnetization apparatus 110.

FIG. 5 schematically illustrates an example of a system configuration of the demagnetization apparatus 110. In the present embodiment, the demagnetization apparatus 110 includes, for example, a heating furnace 500, a gas supply apparatus 550, and a control apparatus 560. In the present embodiment, the heating furnace 500 has, for example, an enclosure 510, a gas inlet 512, a gas outlet 514, a temperature adjustment unit 520, a power source 522, a shelf 530, a temperature sensor 542, and a gas concentration sensor 544. In the present embodiment, the gas supply apparatus 550 has, for example, an inert gas supply source 552 and a reducing gas supply source 554.

In the present embodiment, the heating furnace 500 is to heat an object housed inside the enclosure 510. In the present embodiment, the heating furnace 500 heats the above described object by adjusting a temperature of an atmosphere gas inside the enclosure 510. Thus, atmosphere heat treatment of the object is performed. Examples of the object include the rotor 20, the permanent magnet 24, and the like.

In the present embodiment, the enclosure 510 includes a space surround by a heat insulating material (which may be referred to as a heat treatment space). The enclosure 510 is to house the object in the heat treatment space.

In the present embodiment, the gas inlet 512 is to link the heat treatment space with the outside of the enclosure 510. The gas inlet 512 links the heat treatment space with the gas supply apparatus 550, for example. A gas supplied from the gas supply apparatus 550 flows into the heat treatment space of the enclosure 510 through the gas inlet 512. The gas inlet 512 may include an inflow amount adjustment unit (not illustrated) configured to adjust an inflow amount of the gas supplied from the gas supply apparatus 550 into the heat treatment space. Examples of the inflow amount adjustment unit include a valve. The inflow amount adjustment unit may adjust an amount of gas flowing into the heat treatment space according to an instruction from the control apparatus 560.

In the present embodiment, the gas outlet 514, the heat treatment space, and the outside of the enclosure 510 are linked. The gas present inside the heat treatment space is emitted to the outside of the enclosure 510 through the gas outlet 514. The gas outlet 514 may include an emission amount adjustment unit (not illustrated) configured to adjust an emission amount of the gas from the heat treatment space. Examples of the emission amount adjustment unit include a valve. The emission amount adjustment unit may adjust an amount of gas emitted from the heat treatment space according to an instruction from the control apparatus 560.

In the present embodiment, the temperature adjustment unit 520 is configured to adjust a temperature of the heat treatment space. For example, the temperature adjustment unit 520 heats an atmosphere gas present in the heat treatment space. Thus, an atmosphere temperature is raised. A heating type of the temperature adjustment unit 520 is not particularly limited. Similarly, the temperature adjustment unit 520 cools the atmosphere gas present in the heat treatment space. Thus, the atmosphere temperature is decreased. A cooling type of the temperature adjustment unit 520 is not particularly limited. In the present embodiment, the temperature adjustment unit 520 adjusts the temperature of the atmosphere gas by electrical power supplied from the power source 522.

In the present embodiment, the power source 522 is configured to adjust electrical power to be supplied to the temperature adjustment unit 520 according to an instruction from the control apparatus 560. Thus, the temperature and the treating time period of the heat treatment in the demagnetization apparatus 110 may be controlled.

In the present embodiment, the shelf 530 is to be arranged in the heat treatment space of the enclosure 510. The shelf 530 supports an object. The shelf 530 may support a plurality of objects.

In the present embodiment, the temperature sensor 542 is configured to measure a temperature of an atmosphere gas in the heat treatment space. The temperature sensor 542 informs the control apparatus 560 of information indicating a measurement result.

In the present embodiment, the gas concentration sensor 544 is configured to measure a concentration of a particular component contained in the atmosphere gas of the heat treatment space. The heating furnace 500 may have a plurality of gas concentration sensors 544. Thus, concentrations of a plurality of components contained in the atmosphere gas of the heat treatment space are to be measured. Examples of the above described components include a reducing substance, oxygen, hydrogen, and the like. The gas concentration sensor 544 may have a pressure sensor configured to measure a pressure of the atmosphere gas or a partial pressure of each component. The gas concentration sensor 544 informs the control apparatus 560 of information indicating a measurement result.

The control apparatus 560 is configured to control the demagnetization apparatus 110. For example, the control apparatus 560 controls an operation of each unit of the demagnetization apparatus 110 to adjust the temperature of the heat treatment space of the heating furnace 500. For example, the control apparatus 560 controls the operation of each unit of the demagnetization apparatus 110 to adjust a composition of the atmosphere gas of the heat treatment space of the heating furnace 500. For example, the control apparatus 560 adjusts the treating time period of the heat treatment.

In the present embodiment, the gas supply apparatus 550 is configured to supply an atmosphere gas to the heating furnace 500. The gas supply apparatus 550 supplies, for example, an inert gas, a reducing gas, or a gas obtained by mixing these to the heating furnace 500. The inert gas supply source 552 is configured to supply an inert gas to the heating furnace 500. The reducing gas supply source 554 is configured to supply a reducing gas to the heating furnace 500.

Example of Another Embodiment

In the present embodiment, a detail of the demagnetization apparatus 110 has been described while a case is used as an example where the gas supply apparatus 550 supplies, for example, an inert gas, a reducing gas, or a gas obtained by mixing these to the heating furnace 500. However, the demagnetization apparatus 110 is not limited to the present embodiment.

In another embodiment, instead of the inert gas supply source 552 or in addition to the inert gas supply source 552, the demagnetization apparatus 110 may include a neutral gas supply source configured to supply a neutral gas such as $N_2$ gas to the heating furnace 500. In still another embodiment, the demagnetization apparatus 110 may include a pressure adjustment unit configured to emit the gas of the heat treatment space of the heating furnace 500 and adjust a pressure of the heat treatment space to vacuum or a pressure lower than an atmosphere pressure. Thus, for example, an oxygen concentration of the heat treatment space is adjusted to 0.1% or less.

Figure 6:
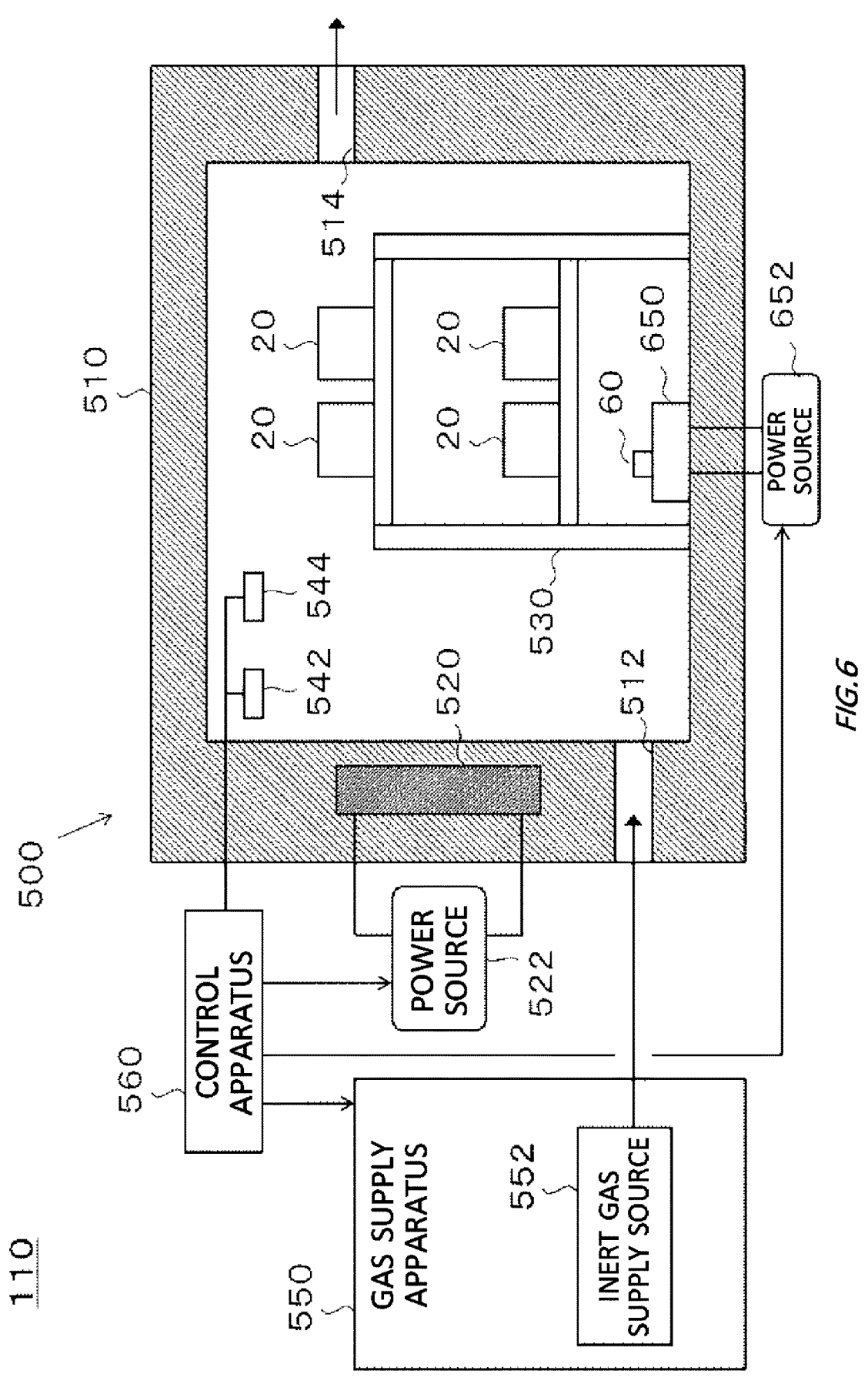
FIG. 6 schematically illustrates another example of the system configuration of the demagnetization apparatus 110.

FIG. 6 schematically illustrates another example of the system configuration of the demagnetization apparatus 110. The demagnetization apparatus 110 described in connection to FIG. 6 is different from the demagnetization apparatus 110 described in connection to FIG. 5 in (i) that the gas supply apparatus 550 does not include the reducing gas supply source 554 and (ii) that a reducing gas generation source 60, a heating unit 650, and a power source 652 are included inside the enclosure 510. The demagnetization apparatus 110 described in connection to FIG. 6 may have a configuration similar to the demagnetization apparatus 110 described in connection to FIG. 5 except for the above described differences.

In the present embodiment, the reducing gas generation source 60 is configured to generate a gas of a reducing substance by heating, for example. Examples of the reducing gas generation source 60 include (i) a mixture of solid carbon and $SiO_2$, (ii) solid carbon arranged inside a container of $SiO_2$, and the like.

In the present embodiment, the heating unit 650 is configured to heat the reducing gas generation source 60. A heating type of the heating unit 650 is not particularly limited. In the present embodiment, the heating unit 650 heats the reducing gas generation source 60 by electrical power supplied from the power source 652.

In the present embodiment, a power source 622 is configured to adjust electrical power supplied to the heating unit 650 according to an instruction from the control apparatus 560. Thus, a generation amount of the reducing gas and timing at which the reducing gas is generated may be adjusted.

Figure 7:
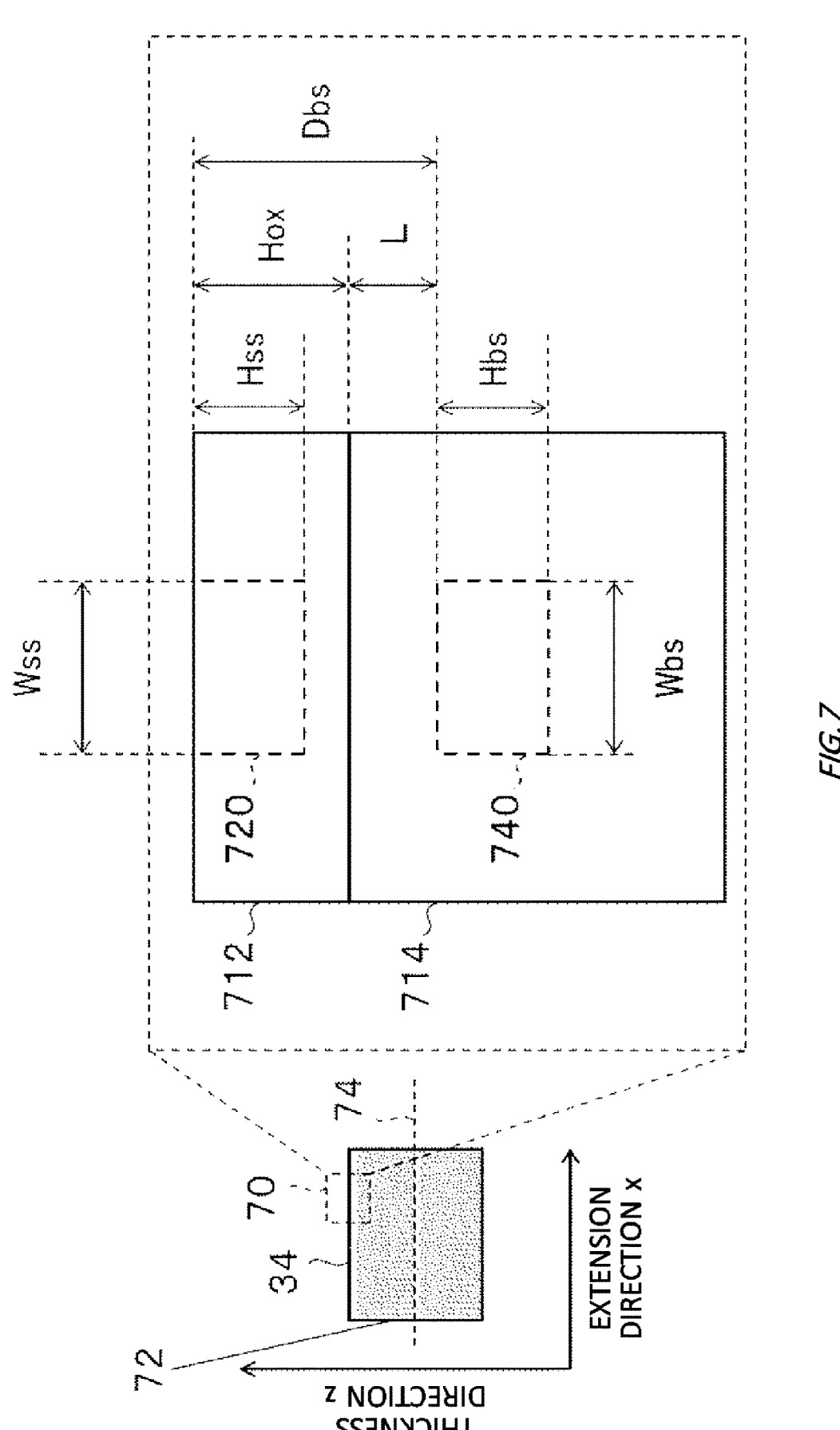
FIG. 7 schematically illustrates an example of a measurement method of a carbon concentration distribution of a molded body 34.

FIG. 7 schematically illustrates an example of a measurement method of a carbon concentration distribution of the molded body 34. As described above, the content of the reducing substance may vary in the vicinity of the surface of the molded body 34 and in the vicinity of the center of the molded body 34. For example, the ratio of (b) the concentration of the reducing substance in the region within 10 μm from the surface of the molded body 34 (which may be referred to as the surface layer region) to (a) the concentration of the reducing substance in the region which is arranged in the position away from the surface of the molded body 34 by more than 10 μm and which has the thickness of 10 μm (which may be referred to as the interior region) may be 1.1 or more.

With reference to FIG. 7, a detail of the interior region and the surface layer region will be described. For example, when the molded body 34 has a columnar shape, the molded body 34 is cut along an extension direction of the molded body 34. The molded body 34 may be cut along a center line 74 passing through a center of a cross section 72 in a case where the molded body 34 is cut by a plane substantially perpendicular to the extension direction of the molded body 34. A region close to the surface of the molded body 34 in a cut section of the molded body 34 is set as a region under observation 70 that is to be a measurement target of the carbon concentration distribution. When the molded body 34 is small, an entirety of the cut section of the molded body 34 may be set as the region under observation 70.

The region under observation 70 is observed by using an electron beam probe microanalyzer or a scanning electron microscopy to decide a rectangular surface layer region 720 with a width Wss×a height Hss and a rectangular interior region 740 with a width Wbs×a height Hbs. The height Hss of the surface layer region 720 is set, for example, to 10 μm. The height Hbs of the interior region 740 is set, for example, to 10 μm. The width Wss of the surface layer region 720 is set, for example, to 10 μm. The width Wbs of the interior region 740 is set, for example, to 10 μm.

A position in a thickness direction of the surface layer region 720 is decided such that one side of the surface layer region 720 is substantially in contact with the surface of the molded body 34. A position in a thickness direction of the interior region 740 is decided such that a minimum distance Dbs between one side of the interior region 740 and the surface of the molded body 34 becomes 2.5 mm or more. When a thickness of the molded body 34 is less than 30 μm, the interior region 740 is decided such that the above described minimum distance Dbs becomes 10 μm. In this case, the height Hbs of the interior region 740 is less than 10 μm.

As illustrated in FIG. 7, the molded body 34 has a surface oxidation layer 712 and a bulk layer 714. The surface oxidation layer 712 is a layer in which oxidation of a material forming the molded body 34 is relatively advanced, and a thickness of the surface oxidation layer 712 is denoted by Hox. The bulk layer 714 is a layer in which the oxidation of the material forming the molded body 34 is not relatively advanced, and is a portion other than the surface oxidation layer 712. A position in a thickness direction of the interior region 740 may be decided such that a minimum distance L between one side of the interior region 740 and the surface oxidation layer 712 becomes 2.5 mm or more.

Example of Another Embodiment

In the present embodiment, a detail of the surface layer region 720 and the interior region 740 has been described while a case is used as an example where the surface layer region 720 and the interior region 740 are set inside the single region under observation 70. However, the interior region 740 is not limited to the present embodiment. In another embodiment, the interior region 740 may be set in the vicinity the center line 74.

Figure 8:
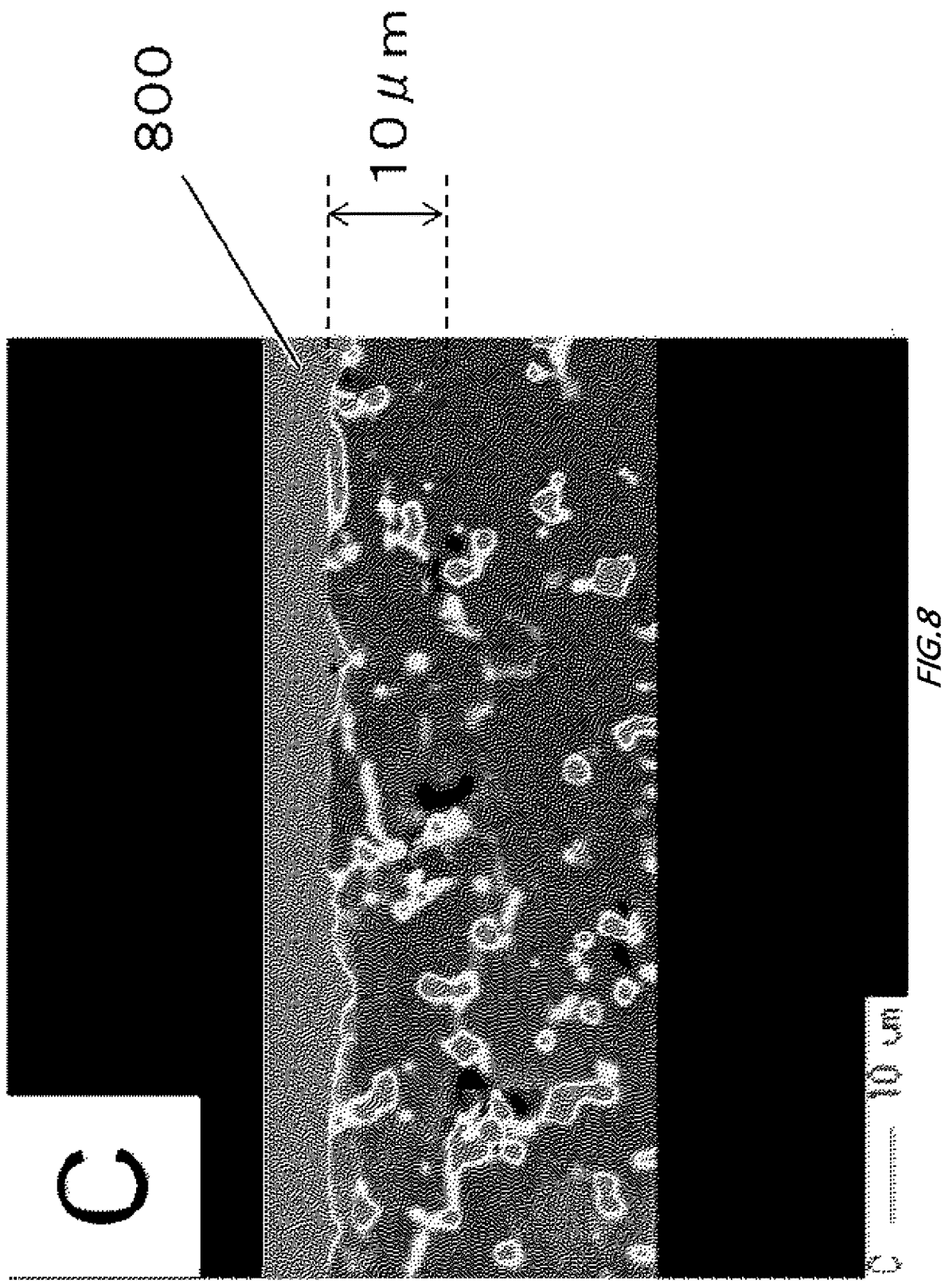
FIG. 8 illustrates an example of a carbon concentration distribution of a permanent magnet 24 before heat treatment.
Figure 9:
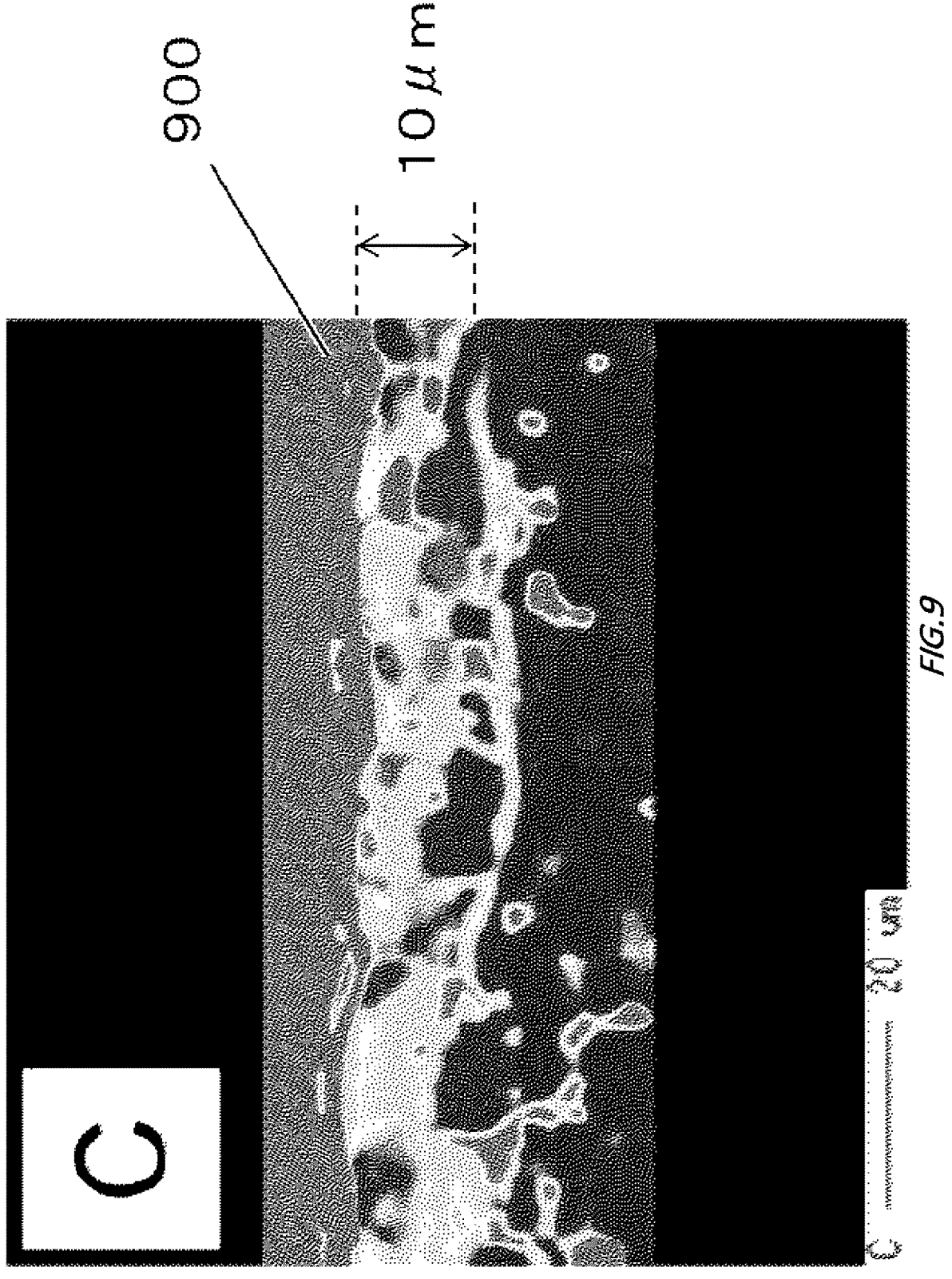
FIG. 9 illustrates an example of a carbon concentration distribution of a molded body 34 after the heat treatment.

With reference to FIG. 8 and FIG. 9, a fluctuation of a carbon concentration distribution of a magnet material due to heat treatment will be described. FIG. 8 illustrates an example a carbon concentration distribution of the permanent magnet 24 yet to be heat-treated in a reducing atmosphere. FIG. 9 illustrates an example of a carbon concentration distribution of the molded body 34 that has been heat-treated in the reducing atmosphere.

FIG. 8 is an observation result by observing a carbon concentration distribution in a cut section of an Nd—Fe—B based sintered magnet yet to be heat-treated, by using an electron beam probe microanalyzer (manufactured by JEOL, Ltd., JXA-iSP100). A composition of the Nd—Fe—B based sintered magnet was Nd:Fe:B=20 to 23:64 to 67:1 (mass ratio).

To observe the carbon concentration distribution, first, a surface of the Nd—Fe—B based sintered magnet was coated with embedding resin (acrylic or silicon-based resin) for observation. Subsequently, the Nd—Fe—B based sintered magnet was cut along a center line of the Nd—Fe—B based sintered magnet. The region under observation 70 was set in the vicinity of a center in an extension direction of the Nd—Fe—B based sintered magnet.

In FIG. 8, a region 800 represents the embedding resin described above. As illustrated in FIG. 8, it is found out that in the sintered magnet yet to be heat-treated, a carbon concentration in a surface layer region within 10 μm from the surface of the sintered magnet and a carbon concentration in an interior region away from the surface of the sintered magnet by more than 10 μm are substantially identical to each other.

FIG. 9 is an observation result by observing the carbon concentration distribution in the cut section of the Nd—Fe—B based sintered magnet described above after the heat treatment, by using the electron beam probe microanalyzer (manufactured by JEOL, Ltd., JXA-iSP100). In the heat treatment of the Nd—Fe—B based sintered magnet, an atmosphere temperature was 600° C., and a treating time period was 21 hours. In addition, a carbon monoxide concentration in an atmosphere gas was 99.9%.

To observe the carbon concentration distribution, first, the surface of the Nd—Fe—B based sintered magnet was coated with embedding resin (acrylic or silicon-based resin) for observation. Subsequently, the Nd—Fe—B based sintered magnet was cut along the center line of the Nd—Fe—B based sintered magnet. The region under observation 70 was set in the vicinity of the center in the extension direction of the Nd—Fe—B based sintered magnet.

In FIG. 9, a region 900 represents the embedding resin described above. As illustrated in FIG. 9, it is found out that in the sintered magnet yet to be heat-treated, the carbon concentration in the surface layer region within 10 μm from the surface of the sintered magnet and the carbon concentration in the interior region away from the surface of the sintered magnet by more than 10 μm are largely different from each other. Specifically, a ratio of the carbon concentration in the surface layer region to the carbon concentration in the interior region was 1.1 or more.

EXAMPLES (Creating of Magnet Sample)

The Nd—Fe—B based sintered magnet was created through the following procedure. First, a raw material of Nd, a raw material of Fe, and a raw material of B were blended to obtain Nd:Fe:B=20 to 23:64 to 67:1 (mass ratio), and an Nd—Fe—B based alloy was created. Then, by using the Nd—Fe—B based alloy, a magnet sample having a cuboid shape at 12.3 mm×9.2 mm×5.4 mm was created.

(Heating Test)

Example 1

After the magnet sample was arranged inside a tube furnace (manufactured by Koyo Thermo Systems Co., Ltd., KTF647N2) that is an example of the heating furnace, carbon monoxide (purity: 99.9% or more) was caused to flow to the inside of the tube furnace. When a carbon monoxide concentration inside the tube furnace became 99.9% or more, heating of the tube furnace was started. A temperature in the tube furnace at the start of the heating was 20° C. The atmosphere gas in the tube furnace was heated at a rate of temperature increase of 2.2° C./minute until the atmosphere temperature in the tube furnace became 320° C. Subsequently, the atmosphere temperature in the tube furnace was maintained at 320° C. for 30 minutes. A length of the above described treating time period was decided such that a temperature in the vicinity of a center of the magnet sample became approximately 320° C.

When the above described treating time period elapsed, the atmosphere gas in the tube furnace was cooled at a rate of temperature decrease of 0.33° C./minute. After the magnet sample was cooled to a room temperature, the magnet sample was cut along an extension direction of the magnet sample. The room temperature was 20° C. A cut section of the magnet sample was observed by using an electron beam probe microanalyzer (manufactured by JEOL, Ltd., JXA-iSP100) and a scanning electron microscopy (manufactured by JEOL, Ltd., JSM-IT). In addition, a thickness of a surface oxidation layer was measured by an image analysis. A measurement result of the thickness of the surface oxidation layer is illustrated in Table 1.

Example 2

The thickness of the surface oxidation layer was measured similar as in Example 1 except that the atmosphere temperature in the tube furnace was maintained at 400° C. The measurement result of the thickness of the surface oxidation layer is illustrated in Table 1.

Example 3

The thickness of the surface oxidation layer was measured similar as in Example 1 except that the atmosphere temperature in the tube furnace was maintained at 600° C. The measurement result of the thickness of the surface oxidation layer is illustrated in Table 1.

Comparative Example 1

The thickness of the surface oxidation layer was measured similar as in Example 1 except that the atmosphere in the tube furnace was an ambient atmosphere. The measurement result of the thickness of the surface oxidation layer is illustrated in Table 1.

Comparative Example 2

The thickness of the surface oxidation layer was measured similar as in Example 2 except that the atmosphere in the tube furnace was an ambient atmosphere. In Comparative Example 2, the magnet sample was broken or chipped by the heat treatment, and it was not possible to measure the thickness of the surface oxidation layer. The measurement result of the thickness of the surface oxidation layer is illustrated in Table 1. In Table 1, N/A indicates that the measurement was not possible because of the reason described above.

Comparative Example 3

The thickness of the surface oxidation layer was measured similar as in Example 3 except that the atmosphere in the tube furnace was an ambient atmosphere. In Comparative Example 3, the magnet sample was broken or chipped by the heat treatment, and it was not possible to measure the thickness of the surface oxidation layer. The measurement result of the thickness of the surface oxidation layer is illustrated in Table 1.

Comparative Example 4

The thickness of the surface oxidation layer was measured similar as in Example 1 except that the atmosphere in the tube furnace was vacuum. Note that a pressure in the tube furnace was 100 Pa. That is, a partial pressure of oxygen was 100 Pa or less. The measurement result of the thickness of the surface oxidation layer is illustrated in Table 1.

Comparative Example 5

The thickness of the surface oxidation layer was measured similar as in Example 2 except that the atmosphere in the tube furnace was vacuum. Note that a pressure in the tube furnace was 100 Pa. That is, a partial pressure of oxygen was 100 Pa or less. The measurement result of the thickness of the surface oxidation layer is illustrated in Table 1.

Comparative Example 6

The thickness of the surface oxidation layer was measured similar as in Example 3 except that the atmosphere in the tube furnace was vacuum. Note that a pressure in the tube furnace was 100 Pa. That is, a partial pressure of oxygen was 100 Pa or less. The measurement result of the thickness of the surface oxidation layer is illustrated in Table 1.

Comparative Example 7

The thickness of the surface oxidation layer was measured similar as in Example 1 except that the atmosphere in the tube furnace was 99.9% nitrogen gas. The measurement result of the thickness of the surface oxidation layer is illustrated in Table 1.

Comparative Example 8

The thickness of the surface oxidation layer was measured similar as in Example 2 except that the atmosphere in the tube furnace was 99.9% nitrogen gas. The measurement result of the thickness of the surface oxidation layer is illustrated in Table 1.

Comparative Example 9

The thickness of the surface oxidation layer was measured similar as in Example 3 except that the atmosphere in the tube furnace was 99.9% nitrogen gas. The measurement result of the thickness of the surface oxidation layer is illustrated in Table 1.

Comparative Example 10

The thickness of the surface oxidation layer was measured similar as in Example 1 except that the atmosphere in the tube furnace was 99.9% argon gas. The measurement result of the thickness of the surface oxidation layer is illustrated in Table 1.

Comparative Example 11

The thickness of the surface oxidation layer was measured similar as in Example 2 except that the atmosphere in the tube furnace was 99.9% argon gas. The measurement result of the thickness of the surface oxidation layer is illustrated in Table 1.

Comparative Example 12

The thickness of the surface oxidation layer was measured similar as in Example 2 except that the atmosphere in the tube furnace was 99.9% argon gas. The measurement result of the thickness of the surface oxidation layer is illustrated in Table 1.

measurement result of the thickness of the surface oxidation layer is illustrated in Table 2.

Comparative Examples 19 to 21

After the heat treatment similar to Comparative Examples 10 and 12 was performed twice, the thickness of the surface oxidation layer was measured similar as in Example 1. The measurement result of the thickness of the surface oxidation layer is illustrated in Table 2.

TABLE 1

| No. | ATMOSPHERE UPON HEATING | | HEATING TEMPERATURE [° C.] | THICKNESS OF OXIDATION LAYER [μm] | HISTORY OF HEAT TREATMENT |
|---|---|---|---|---|---|
| | MAIN COMPONENT | CONCENTRATION | | | |
| EXAMPLE 1 | CARBON MONOXIDE | 99.9% | 320 | 1.66 | FIRST TIME |
| EXAMPLE 2 | CARBON MONOXIDE | 99.9% | 400 | 3.01 | |
| EXAMPLE 3 | CARBON MONOXIDE | 99.9% | 600 | 11.60 | |
| COMPARATIVE EXAMPLE 1 | AMBIENT | — | 320 | 1.92 | |
| COMPARATIVE EXAMPLE 2 | AMBIENT | — | 400 | N/A | |
| COMPARATIVE EXAMPLE 3 | AMBIENT | — | 600 | N/A | |
| COMPARATIVE EXAMPLE 4 | VACUUM | — | 320 | 1.74 | |
| COMPARATIVE EXAMPLE 5 | VACUUM | — | 400 | 4.69 | |
| COMPARATIVE EXAMPLE 6 | VACUUM | — | 600 | 32.95 | |
| COMPARATIVE EXAMPLE 7 | NITROGEN | 99.9% | 320 | 2.14 | |
| COMPARATIVE EXAMPLE 8 | NITROGEN | 99.9% | 400 | 6.28 | |
| COMPARATIVE EXAMPLE 9 | NITROGEN | 99.9% | 600 | 17.30 | |
| COMPARATIVE EXAMPLE 10 | ARGON | 99.9% | 320 | 2.22 | |
| COMPARATIVE EXAMPLE 11 | ARGON | 99.9% | 400 | 3.66 | |
| COMPARATIVE EXAMPLE 12 | ARGON | 99.9% | 600 | 18.29 | |

Examples 4 to 6

After the heat treatment similar to Examples 1 to 3 was performed twice, the thickness of the surface oxidation layer was measured similar as in Example 1. The measurement result of the thickness of the surface oxidation layer is illustrated in Table 2.

Comparative Examples 13 to 15

After the heat treatment similar to Comparative Examples 4 to 6 was performed twice, the thickness of the surface oxidation layer was measured similar as in Example 1. The measurement result of the thickness of the surface oxidation layer is illustrated in Table 2.

Comparative Examples 16 to 18

After the heat treatment similar to Comparative Examples 7 to 9 was performed twice, the thickness of the surface oxidation layer was measured similar as in Example 1. The

Examples 7 and 8

After the heat treatment similar to Examples 1 and 2 was performed three times, the thickness of the surface oxidation layer was measured similar as in Example 1. The measurement result of the thickness of the surface oxidation layer is illustrated in Table 3.

Comparative Examples 22 and 23

After the heat treatment similar to Comparative Examples 4 and 5 was performed three times, the thickness of the surface oxidation layer was measured similar as in Example 1. The measurement result of the thickness of the surface oxidation layer is illustrated in Table 3.

Comparative Examples 24 and 25

After the heat treatment similar to Comparative Examples 7 and 8 was performed three times, the thickness of the surface oxidation layer was measured similar as in Example 1. The measurement result of the thickness of the surface oxidation layer is illustrated in Table 3.

Comparative Examples 26 and 27

After the heat treatment similar to Comparative Examples 10 and 11 was performed three times, the thickness of the surface oxidation layer was measured similar as in Example 1. The measurement result of the thickness of the surface oxidation layer is illustrated in Table 3.

described embodiments. In addition, the matters described with regard to the particular embodiment can be applied to other embodiments with a range without causing technical contradictions. It is also apparent from the description of the claims that the embodiments to which such alterations or improvements are made can be included in the technical scope of the present invention.

The operations, procedures, steps, and stages of each process performed by an apparatus, system, program, and

TABLE 2

| No. | ATMOSPHERE UPON HEATING | | HEATING TEMPER- ATURE [° C.] | THICKNESS OF OXIDATION LAYER [μm] | HISTORY OF HEAT TREATMENT |
|---|---|---|---|---|---|
| | MAIN COMPONENT | CONCEN- TRATION | | | |
| EXAMPLE 4 | CARBON MONOXIDE | 99.9% | 320 | 1.94 | SECOND TIME |
| EXAMPLE 5 | CARBON MONOXIDE | 99.9% | 400 | 3.62 | |
| EXAMPLE 6 | CARBON MONOXIDE | 99.9% | 600 | N/A | |
| COMPARATIVE EXAMPLE 13 | VACUUM | — | 320 | N/A | |
| COMPARATIVE EXAMPLE 14 | VACUUM | — | 400 | N/A | |
| COMPARATIVE EXAMPLE 15 | VACUUM | — | 600 | N/A | |
| COMPARATIVE EXAMPLE 16 | NITROGEN | 99.9% | 320 | N/A | |
| COMPARATIVE EXAMPLE 17 | NITROGEN | 99.9% | 400 | N/A | |
| COMPARATIVE EXAMPLE 18 | NITROGEN | 99.9% | 600 | N/A | |
| COMPARATIVE EXAMPLE 19 | ARGON | 99.9% | 320 | 2.82 | |
| COMPARATIVE EXAMPLE 20 | ARGON | 99.9% | 400 | N/A | |
| COMPARATIVE EXAMPLE 21 | ARGON | 99.9% | 600 | N/A | |

TABLE 3

| No. | ATMOSPHERE UPON HEATING | | HEATING TEMPER- ATURE [° C.] | THICKNESS OF OXIDATION LAYER [μm] | HISTORY OF HEAT TREATMENT |
|---|---|---|---|---|---|
| | MAIN COMPONENT | CONCEN- TRATION | | | |
| EXAMPLE 7 | CARBON MONOXIDE | 99.9% | 320 | 2.12 | THIRD TIME |
| EXAMPLE 8 | CARBON MONOXIDE | 99.9% | 400 | 3.84 | |
| COMPARATIVE EXAMPLE 22 | VACUUM | — | 320 | N/A | |
| COMPARATIVE EXAMPLE 23 | VACUUM | — | 400 | N/A | |
| COMPARATIVE EXAMPLE 24 | NITROGEN | 99.9% | 320 | N/A | |
| COMPARATIVE EXAMPLE 25 | NITROGEN | 99.9% | 400 | N/A | |
| COMPARATIVE EXAMPLE 26 | ARGON | 99.9% | 320 | 2.87 | |
| COMPARATIVE EXAMPLE 27 | ARGON | 99.9% | 400 | N/A | |

While the embodiments of the present invention have been described above, the technical scope of the present invention is not limited to the above described embodiments. It is apparent to persons skilled in the art that various alterations and improvements can be added to the above method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: motor; 12: shaft; 14: stator; 20: rotor; 22: rotor core; 24: permanent magnet; 34: molded body; 44: reclaimed material; 50: reclaimed product; 60: reducing gas generation source; 70: region under observation; 72: cross section, 74: center line; 100: rotor manufacturing system; 110 demagnetization apparatus; 120: reproduction apparatus; 130: assembly apparatus; 140: magnetization apparatus; 210: through hole; 220: through hole; 230: fixing member; 500: heating furnace; 510: enclosure; 512: gas inlet; 514: gas outlet; 520: temperature adjustment unit; 522: power source; 530: shelf; 542: temperature sensor; 544: gas concentration sensor; 550: gas supply apparatus; 552: inert gas supply source; 554: reducing gas supply source; 560: control apparatus; 622: power source; 650: heating unit; 652: power source; 712: surface oxidation layer; 714: bulk layer; 720: surface layer region; 740: interior region; 800: region; 900: region.

What is claimed is:

1. A method of producing a magnet material, the method comprising:
   demagnetizing, by thermal demagnetization in an irreversible manner, a permanent magnet that is molded, by heating the permanent magnet in a presence of a reducing substance having a reducing property stronger than nitrogen molecules; and
   cooling the permanent magnet that is demagnetized to create a magnet material that is molded, wherein
   the permanent magnet that is molded is a magnet attached to a rotor of an electric motor, and
   the method further comprises:
   removing the magnet material that is molded from the rotor.

2. The method of producing the magnet material according to claim 1, wherein
   the reducing substance is at least one selected from among solid carbon, carbon monoxide, hydrocarbon, hydrogen sulfide, and sulfur dioxide.

3. The method of producing the magnet material according to claim 2, wherein
   the demagnetizing includes
   arranging the permanent magnet inside a heating furnace, and
   adjusting a gas by adjusting an atmosphere inside the heating furnace to a reducing atmosphere having a reducing property stronger than a neutral gas atmosphere in which a concentration of nitrogen gas is 99.9% or more.

4. The method of producing the magnet material according to claim 1, wherein
   the demagnetizing includes
   arranging the permanent magnet inside a heating furnace, and
   adjusting a gas by adjusting an atmosphere inside the heating furnace to a reducing atmosphere having a reducing property stronger than a neutral gas atmosphere in which a concentration of nitrogen gas is 99.9% or more.

5. The method of producing the magnet material according to claim 4, wherein
   the adjusting the gas includes
   performing deoxidation by adjusting the atmosphere inside the heating furnace to set a partial pressure of oxygen to 100 Pa or less.

6. The method of producing the magnet material according to claim 5, wherein
   in the reducing atmosphere,
   a concentration of the reducing substance is 99.9% or more, and
   a concentration of oxygen is 0.1% or less.

7. The method of producing the magnet material according to claim 5, wherein
   the demagnetizing further includes
   adjusting a temperature by maintaining a temperature inside the heating furnace at a first temperature or more for at least a first period after the adjusting the gas is performed,
   a length of the first period is 24 hours or less, and
   the first temperature and the first period are decided such that a residual magnetic flux of the magnet material created in the cooling becomes 10 mT or less.

8. The method of producing the magnet material according to claim 5, wherein
   the demagnetizing further includes
   adjusting a temperature by adjusting a temperature inside the heating furnace to 250° C. or more.

9. The method of producing the magnet material according to claim 4, wherein
   in the reducing atmosphere,
   a concentration of the reducing substance is 99.9% or more, and
   a concentration of oxygen is 0.1% or less.

10. The method of producing the magnet material according to claim 4, wherein
   the demagnetizing further includes
   adjusting a temperature by maintaining a temperature inside the heating furnace at a first temperature or more for at least a first period after the adjusting the gas is performed,
   a length of the first period is 24 hours or less, and
   the first temperature and the first period are decided such that a residual magnetic flux of the magnet material created in the cooling becomes 10 mT or less.

11. The method of producing the magnet material according to claim 10, wherein
   the adjusting the temperature includes
   adjusting the temperature inside the heating furnace to a temperature lower than a melting point of a component with a lowest melting point among main components of the permanent magnet.

12. The method of producing the magnet material according to claim 4, wherein
   the demagnetizing further includes
   adjusting a temperature by adjusting a temperature inside the heating furnace to 250° C. or more.

13. The method of producing the magnet material according to claim 4, wherein
   the demagnetizing further includes
   adjusting a temperature by adjusting a temperature inside the heating furnace to a Curie temperature of the permanent magnet or more.

14. The method of producing the magnet material according to claim 1, further comprising:
  treating a surface of the magnet material that is molded.
15. The method of producing the magnet material according to claim 1, further comprising:
  magnetizing the magnet material that is molded.
16. A method of producing a rotor of an electric motor, the method comprising:
  preparing a rotor of an electric motor to which a permanent magnet that is molded is attached;
  demagnetizing, by thermal demagnetization in an irreversible manner, the permanent magnet attached to the rotor, by heating the permanent magnet in a presence of a reducing substance having a reducing property stronger than nitrogen molecules;
  cooling the permanent magnet that is demagnetized to create a magnet material that is molded; and
  removing the magnet material that is molded from the rotor; and
  attaching the magnet material removed from the rotor to the rotor or another rotor.

17. The method of producing the rotor of the electric motor according to claim 16, further comprising:
  magnetizing the magnet material attached to the rotor or the another rotor.
18. A method of producing an electric motor, the method comprising:
  executing the method of producing the rotor of the electric motor according to claim 16; and
  attaching, to a stator of the electric motor, the rotor or the another rotor to which the magnet material is attached.
19. A magnet material with a thickness of 30 μm or more, wherein
  the magnet material contains, as main components, a rare earth element and a transition metal element, and
  a ratio of (b) a carbon concentration in a surface layer region that is a region within 10 μm from a surface of the magnet material to (a) a carbon concentration in an interior region that is a region which is arranged in a position away from the surface of the magnet material by more than 10 μm and which has a thickness of 10 μm is 1.1 or more.

* * * * *